(12) United States Patent
Fujisawa et al.

(10) Patent No.: US 11,115,318 B2
(45) Date of Patent: Sep. 7, 2021

(54) OPTICAL NETWORK CONTROL DEVICES AND OPTICAL PATH SETTING METHOD

(71) Applicant: NEC Corporation, Tokyo (JP)

(72) Inventors: Shinsuke Fujisawa, Tokyo (JP); Hitoshi Takeshita, Tokyo (JP); Akio Tajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 227 days.

(21) Appl. No.: 16/338,549

(22) PCT Filed: Oct. 4, 2017

(86) PCT No.: PCT/JP2017/036063
§ 371 (c)(1),
(2) Date: Apr. 1, 2019

(87) PCT Pub. No.: WO2018/066582
PCT Pub. Date: Apr. 12, 2018

(65) Prior Publication Data
US 2019/0238451 A1   Aug. 1, 2019

(30) Foreign Application Priority Data
Oct. 6, 2016 (JP) .............................. JP2016-197691

(51) Int. Cl.
*H04L 12/703* (2013.01)
*H04L 12/721* (2013.01)
*H04L 12/725* (2013.01)

(52) U.S. Cl.
CPC ............ *H04L 45/28* (2013.01); *H04L 45/123* (2013.01); *H04L 45/302* (2013.01)

(58) Field of Classification Search
CPC ...... H04L 45/28; H04L 45/123; H04L 45/302
See application file for complete search history.

(56) References Cited

U.S. PATENT DOCUMENTS

2011/0038254 A1   2/2011   Hashiguchi et al.
2013/0054834 A1   2/2013   Hashiguchi et al.
(Continued)

FOREIGN PATENT DOCUMENTS

JP   2011-041017 A   2/2011
JP   2011-124669 A   6/2011
(Continued)

OTHER PUBLICATIONS

International Search Report for PCT Application No. PCT/JP2017/036063, dated Jan. 9, 2018.
(Continued)

*Primary Examiner* — Omar J Ghowrwal
(74) *Attorney, Agent, or Firm* — Sughrue Mion, PLLC

(57) ABSTRACT

An optical network control device includes: a path setting unit that sets, based on topology information including a connection relationship among a plurality of nodes and a first route selection index value of routes each connecting the plurality of nodes, a first path for a route having the first route selection index value being minimum from among route candidates linking a start point node and an end point node of a requested traffic; a topology information modification unit that calculates a second route selection index value acquired by increasing the first route selection index value of the route that accommodates the first path; and a path selection unit that selects a second path for a route having the second route selection index value being minimum from among the route candidates.

18 Claims, 23 Drawing Sheets

(56) References Cited

U.S. PATENT DOCUMENTS

| | | | | |
|---|---|---|---|---|
| 2015/0295673 A1* | 10/2015 | Zhang | .................... | H04L 45/22 |
| | | | | 398/5 |
| 2015/0333821 A1 | 11/2015 | Takeshita | | |
| 2016/0301612 A1* | 10/2016 | Hassidim | .............. | H04L 47/781 |
| 2016/0352452 A1* | 12/2016 | Takeshita | ............ | H04J 14/0267 |
| 2017/0302370 A1* | 10/2017 | Fujisawa | ............ | H04Q 11/0062 |

FOREIGN PATENT DOCUMENTS

| | | | |
|---|---|---|---|
| JP | 2013-051647 A | 3/2013 | |
| WO | 2014/020896 A1 | 2/2014 | |
| WO | WO-2015129194 A1 * | 9/2015 | .......... H04J 14/0267 |
| WO | 2015/182075 A1 | 12/2015 | |

OTHER PUBLICATIONS

English translation of Written opinion for PCT Application No. PCT/JP2017/036063.

* cited by examiner

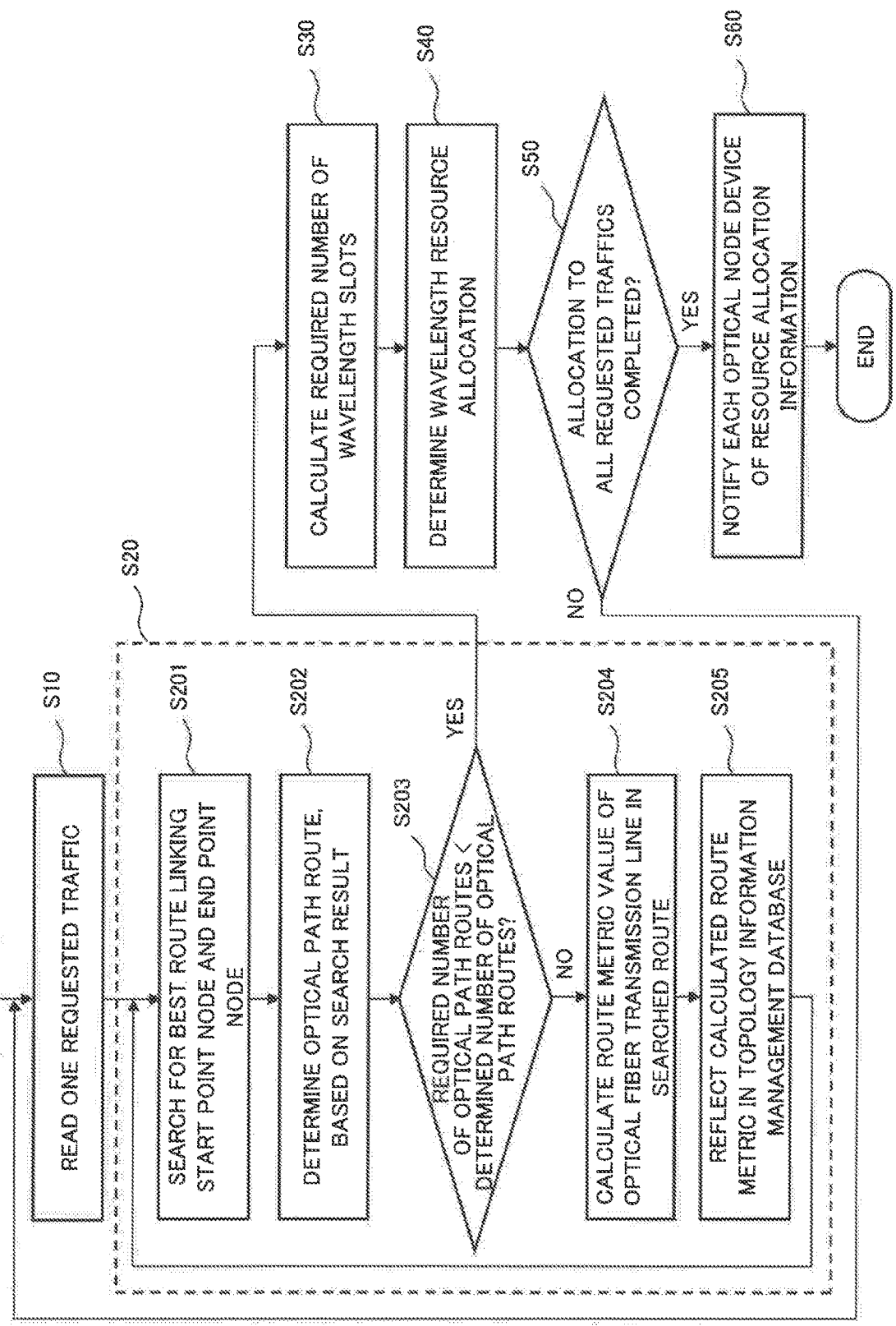

| OPTICAL FIBER TRANSMISSION LINE | ROUTE METRIC VALUE |
|---|---|
| 401 | 100 |
| 402 | 80 |
| 403 | 110 |
| 404 | 170 |
| 405 | 100 |
| 406 | 120 |
| 407 | 150 |

| OPTICAL FIBER TRANSMISSION LINE | ROUTE METRIC VALUE |
|---|---|
| 401 | 300 |
| 402 | 80 |
| 403 | 110 |
| 404 | 170 |
| 405 | 300 |
| 406 | 120 |
| 407 | 150 |

| OPTICAL FIBER TRANSMISSION LINE | ROUTE METRIC VALUE |
|---|---|
| 401 | 300 |
| 402 | 310 |
| 403 | 110 |
| 404 | 170 |
| 405 | 300 |
| 406 | 120 |
| 407 | 380 |

FIG. 9B

| OPTICAL FIBER TRANSMISSION LINE | ROUTE METRIC VALUE |
|---|---|
| 401 | 150 |
| 402 | 250 |
| 403 | 170 |
| 404 | 100 |
| 405 | 80 |
| 406 | 200 |
| 407 | 120 |
| 408 | 100 |

| OPTICAL FIBER TRANSMISSION LINE | ROUTE METRIC VALUE |
|---|---|
| 401 | 550 |
| 402 | 650 |
| 403 | 520 |
| 404 | 450 |
| 405 | 430 |
| 406 | 200 |
| 407 | 120 |
| 408 | 100 |

| OPTICAL FIBER TRANSMISSION LINE | ROUTE METRIC VALUE |
|---|---|
| 401 | 550 |
| 402 | 650 |
| 403 | 895 |
| 404 | 825 |
| 405 | 430 |
| 406 | 200 |
| 407 | 120 |
| 408 | 100 |

| OPTICAL FIBER TRANSMISSION LINE | PHYSICAL ROUTE METRIC VALUE |
|---|---|
| 401 | 100 |
| 402 | 80 |
| 403 | 110 |
| 404 | 170 |
| 405 | 100 |
| 406 | 120 |
| 407 | 150 |

| LOGICAL LINK | PHYSICAL ROUTE | LOGICAL ROUTE METRIC VALUE |
|---|---|---|
| 701 | 401 | 100 |
| 702 | 402,403 | 190 |
| 703 | 404 | 170 |
| 704 | 405 | 100 |
| 705 | 403,406 | 230 |

| LOGICAL LINK | LOGICAL ROUTE METRIC VALUE |
|---|---|
| 701 | 100 |
| 702 | 420 |
| 703 | 170 |
| 704 | 100 |
| 705 | 460 |

OPTICAL NETWORK CONTROL DEVICES AND OPTICAL PATH SETTING METHOD

This application is a National Stage Entry of PCT/JP2017/036063 filed on Oct. 4, 2017, which claims priority from Japanese Patent Application 2016-197691 filed on Oct. 6, 2016, the contents of all of which are incorporated herein by reference, in their entirety.

TECHNICAL FIELD

The present invention relates to an optical network control device and an optical path setting method and, in particular, to an optical network control device and an optical path setting method each including a function of recovering from a fault.

BACKGROUND ART

An optical network provides a function of communicating a requested traffic via an optical fiber communication channel connecting locations. In an optical network, a large capacity of signal light in which requested traffics from clients are multiplexed by using various multiplexing systems is communicated via an optical fiber communication channel. As a multiplexing system, a wavelength division multiplexing (WDM) system, a time division multiplexing (TDM) system, and the like are used.

In recent years, in an optical network, large-capacity traffic of a 10 Tera bits per second (Tbps) range is communicated, for example, by a wavelength division multiplexing system. Therefore, importance of a technique for rapid recovery from a fault (a communication disconnection) that occurs due to a cause such as a disconnection of a communication channel and a fault of a device in a location is increasing.

As one fault recovery technique in such an optical network, an optical path protection system is known. An optical path protection system is a system for allocating a standby system on a physical route where the physical route overlapping with a working system is minimum, i.e., route diversity is maximum, and executing switching of a path to a standby system remaining upon fault occurrence. An optical network employing an optical path protection system is able to recover rapidly from a fault.

In such an optical path protection system, PTL 1 describes one example of a search system for a route where a physical route does not overlap with a working system.

A related route search device described in PTL 1 includes a first route search unit, a topology information modification unit, a port information modification unit, a second route search unit, and a redundant route search unit.

The first route search unit searches for, by using topology information indicating a connection state among nodes in a network where a plurality of nodes are connected with one another via links, a first route having a minimum total sum of costs of links from among a plurality of routes from a start point node to an end point node on the network. The topology information modification unit excludes the first route from the plurality of routes, sets, for a configurational link constituting the first route, an additional link having a direction opposite to the configurational link, and thereby modifies topology information.

The port information modification unit modifies port information indicating a restriction in connection between ports in a restriction node having a restriction in connection between ports, in such a way that, when a restriction node is included in the first route, communication from an end point node to a start point node is permitted in a configurational link and an additional link. The second route search unit searches for a second route different from the first route among a plurality of routes by using the modified topology information and the modified port information. The redundant route search unit is configured to eliminate a configurational link overlapping in the first route and the second route and thereby search for a pair of redundant routes that do not overlap with each other.

By employing such a configuration, it is described that the related route search device is able to search for a redundant route including a link from an end point to a start point on a network including a node restricted in connection between ports.

By repeating the procedure described above, a plurality of standby-system routes can be set in preparation for a situation where faults occur in a plurality of locations at the same time. In this manner, according to an optical path protection system for previously setting standby-system routes on routes that do not overlap with each other and executing switching to a standby-system route remaining upon fault occurrence, rapid recovery can be made from occurrence of a plurality of faults.

Further, as related techniques, there are techniques described in PTLs 2 and 3.

CITATION LIST

Patent Literature

PTL 1: Japanese Unexamined Patent Application Publication No. 2013-51647
PTL 2: International Publication WO 2015/182075
PTL 3: Japanese Unexamined Patent Application Publication No. 2011-041017

SUMMARY OF INVENTION

Technical Problem

In order to previously set a plurality of standby-system routes in preparation for a situation where faults occur in a plurality of locations at the same time, by using the optical path protection system described above, it is necessary to allocate a standby-system route to a route where route diversity in a working route is maximum. In other words, it is necessary to allocate a standby-system route to a route where physical routes overlapping with one another are minimum.

A related route search device searches for a plurality of route candidates other than a route that accommodates a working path, and selects, from among these route candidates, an optical fiber transmission line and a standby-system route that satisfies a physical restriction of a node device.

On the other hand, in an optical network that accommodates large-capacity traffic, a nationwide network is supposed, and therefore the numbers of node devices and optical fiber transmission lines constituting a network are an order of several hundreds to several thousands. Therefore, it may take several hours to acquire a result of route search for each demand. The number of route candidates increases with a power of redundancy with respect to a requested traffic, and a required number of steps of route search for a standby system also increases with a power. Therefore, the number of calculation steps necessary for selecting a route that satisfies the physical restriction described above from among a huge number of route candidates also increases. In other words, when a related route search device is applied to a nationwide optical network, a calculation time for allocating a standby system increases with a power of a requested traffic.

In this manner, there is a problem that, in an optical network, when rapid recovery from faults in a plurality of locations is attempted to be achieved, a calculation time for allocating a standby-system optical path increases.

An object of the present invention is to provide an optical network control device and an optical path setting method that solve a problem, being the problem described above, that, when rapid recovery from faults in a plurality of locations is attempted to be achieved, a calculation time for allocating a standby-system optical path increases.

Solution to Problem

An optical network control device of the present invention includes: a path setting means that sets, based on topology information including a connection relationship among a plurality of nodes and a first route selection index value of routes each connecting the plurality of nodes, a first path for a route having a minimum first route selection index value from among route candidates linking a start point node and an end point node of a requested traffic; a topology information modification means that calculates a second route selection index value acquired by increasing the first route selection index value of the route that accommodates the first path; and a path selection means that selects a second path for a route having a minimum second route selection index value from among the route candidates.

An optical path setting method of the present invention includes: setting, based on topology information including a connection relationship among a plurality of nodes and a first route selection index value of routes each connecting the plurality of nodes, a first path for a route having a minimum first route selection index value from among route candidates linking a start point node and an end point node of a requested traffic; calculating a second route selection index value acquired by increasing the first route selection index value of the route that accommodates the first path; and selecting a second path for a route having a minimum second route selection index value from among the route candidates.

Advantageous Effects of Invention

According to the optical network control device and the optical path setting method of the present invention, while an increase in a calculation time for allocating a standby-system optical path is reduced, rapid recovery from faults in a plurality of locations of an optical network can be achieved.

BRIEF DESCRIPTION OF DRAWINGS

FIG. 5 is a flowchart illustrating an operation of the optical network control device according to the second example embodiment of the present invention.

FIG. 9B is a diagram illustrating a route metric value of an optical fiber transmission line that configures an optical network for illustrating an operation of the optical network control device according to the third example embodiment of the present invention.

EXAMPLE EMBODIMENT

Hereinafter, with reference to the drawings, example embodiments of the present invention are described.

First Example Embodiment

Figure 1:
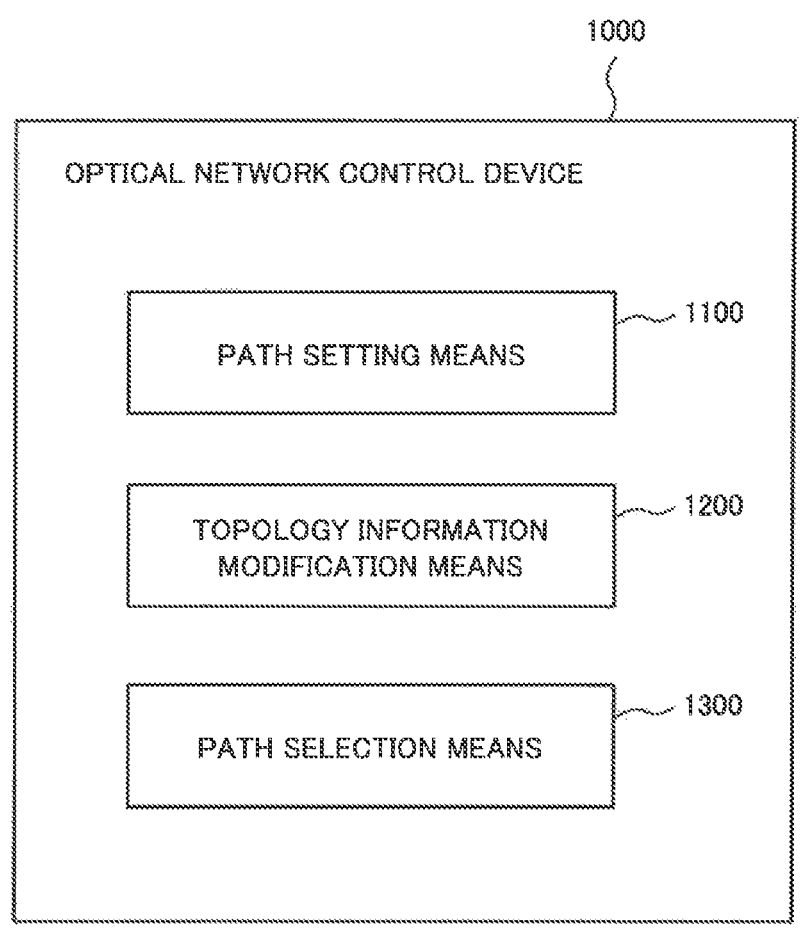
FIG. 1 is a block diagram illustrating a configuration of an optical network control device of a first example embodiment of the present invention.

FIG. 1 is a block diagram illustrating a configuration of an optical network control device 1000 according to a first example embodiment of the present invention. The optical network control device 1000 includes a path setting means (path setting unit) 1100, a topology information modification means (topology information modification unit) 1200, and a path selection means (path selection unit) 1300.

The path setting means 1100 sets, based on topology information, a first path for a route having a minimum first route selection index value from among route candidates linking a start point node and an end point node of a requested traffic. The topology information includes a connection relationship among a plurality of nodes and a first route selection index value of routes each connecting the plurality of nodes. The topology information modification means 1200 calculates a second route selection index value acquired by increasing the first route selection index value of the route that accommodates the first path. The path selection means 1300 selects a second path for a route having a minimum second route selection index value from among the route candidates.

In this manner, in the optical network control device 1000, the topology information modification means 1200 calculates a second route selection index value acquired by increasing a first route selection index value, and the path selection means 1300 selects a second path for a route having a minimum second route selection index value. Therefore, a route having a minimum second route selection index value is searched only once with respect to a requested traffic, and thereby a second path (standby-system path) can be allocated. Therefore, a calculation time for allocating a standby-system optical path linearly increases with respect to the number of requested traffics.

In contrast, according to the related route search device described in Background Art, as described above, a required calculation time increases with a power. Therefore, according to the optical network control device 1000 of the present example embodiment, an increase in a calculation time can be reduced. In other words, according to the optical network control device 1000 of the present example embodiment, while an increase in a calculation time for allocation a standby-system optical path is reduced, rapid recovery from faults in a plurality of locations of an optical network can be achieved.

Next, an optical path setting method according to the present example embodiment is described.

In the optical path setting method according to the present example embodiment, first, a first path is set, based on topology information, for a route having a minimum first route selection index value from among route candidates linking a start point node and an end point node of a requested traffic. Here, the topology information includes a connection relationship among a plurality of nodes and a first route selection index value of routes each connecting the plurality of nodes.

Next, a second route selection index value acquired by increasing the first route selection index value of a transmission line that accommodates the first path is calculated. Then, a second path is selected for a route having a minimum second route selection index value from among the route candidates.

Further, the steps described above may be executed by a computer. In other words, a program for causing a computer to function as a path setting means, a topology information modification means, and a path selection means is usable. The path setting means sets, based on topology information including a connection relationship among a plurality of nodes and a first route selection index value of routes each connecting the plurality of nodes, a first path for a route having a minimum first route selection index value from among route candidates linking a start point node and an end point node of a requested traffic. The topology information modification means calculates a second route selection index value acquired by increasing the first route selection index value of the route that accommodates the first path. The path selection means selects a second path for a route having a minimum second route selection index value from among the route candidates.

As described above, according to the optical network control device 1000 and the optical path setting method of the present example embodiment, while an increase in a calculation time for allocating a standby-system optical path is reduced, rapid recovery from faults in a plurality of locations of an optical network can be achieved.

Figure 2:
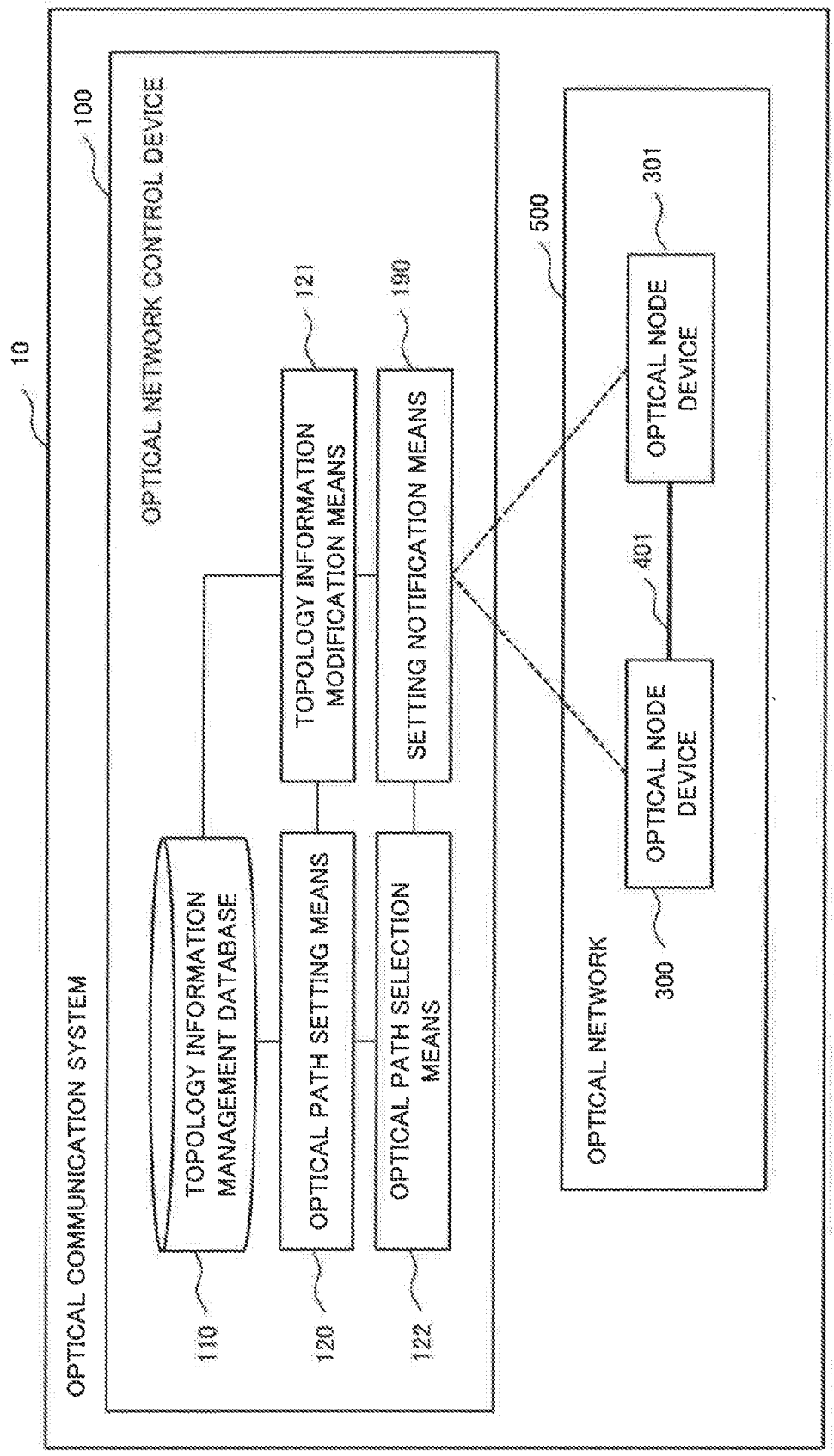
FIG. 2 is a block diagram illustrating a configuration of an optical communication system according to the first example embodiment of the present invention.

FIG. 2 illustrates a configuration of an optical communication system 10 using the optical network control device according to the present example embodiment. The optical communication system 10 includes an optical network control device 100 and an optical network 500.

FIG. 2 illustrates an example in which two optical node devices 300 and 301 are connected by an optical fiber transmission line 401 and configure the optical network 500. Further, the optical network control device 100 includes an optical path setting means 120 as a path setting means, a topology information modification means 121, and an optical path selection means 122 as a path selection means. In addition thereto, a topology information management database (DB) 110 that manages topology information and a setting notification means (setting notification unit) 190 are included.

The topology information management database 110 manages a connection relationship among a plurality of nodes and a route selection index value of a transmission line connecting nodes. The path setting means 120 refers to the topology information management database 110 and sets a path (first optical path) for a route having a minimum route selection index value (first route selection index value) from among route candidates linking a start point node and an end point node of a requested traffic. Next, the topology information modification means 121 modifies a route selection index value of a transmission line that accommodates the path and reflects the modified route selection index value (second route selection index value) in the topology information management database 110. The path selection means 122 selects an addition path (second optical path) for a route having a minimum modified route selection index value.

The optical path information selected here is notified by the setting notification means 190 to the optical node devices 300 and 301, and thereby an optical path is established.

As described above, in the optical network control device 100, the topology information modification means 121 increases and modifies a route selection index value of a transmission line that accommodates a first optical path in such a way that the transmission line is not easily selected. Thereby, a route of a second optical path becomes a route having maximum route diversity with respect to a route of the first optical path. Therefore, a targeted route can be selected without increasing the number of searches for route candidates. Note that, even when a required number of optical paths is three or more, a similar effect is produced.

In this manner, according to the optical network control device 100, without an increase in a calculation time for route search with respect to a plurality of standby systems, allocation of a standby system intended for rapid recovery from faults in a plurality of locations can be achieved.

Second Example Embodiment

Figure 3:
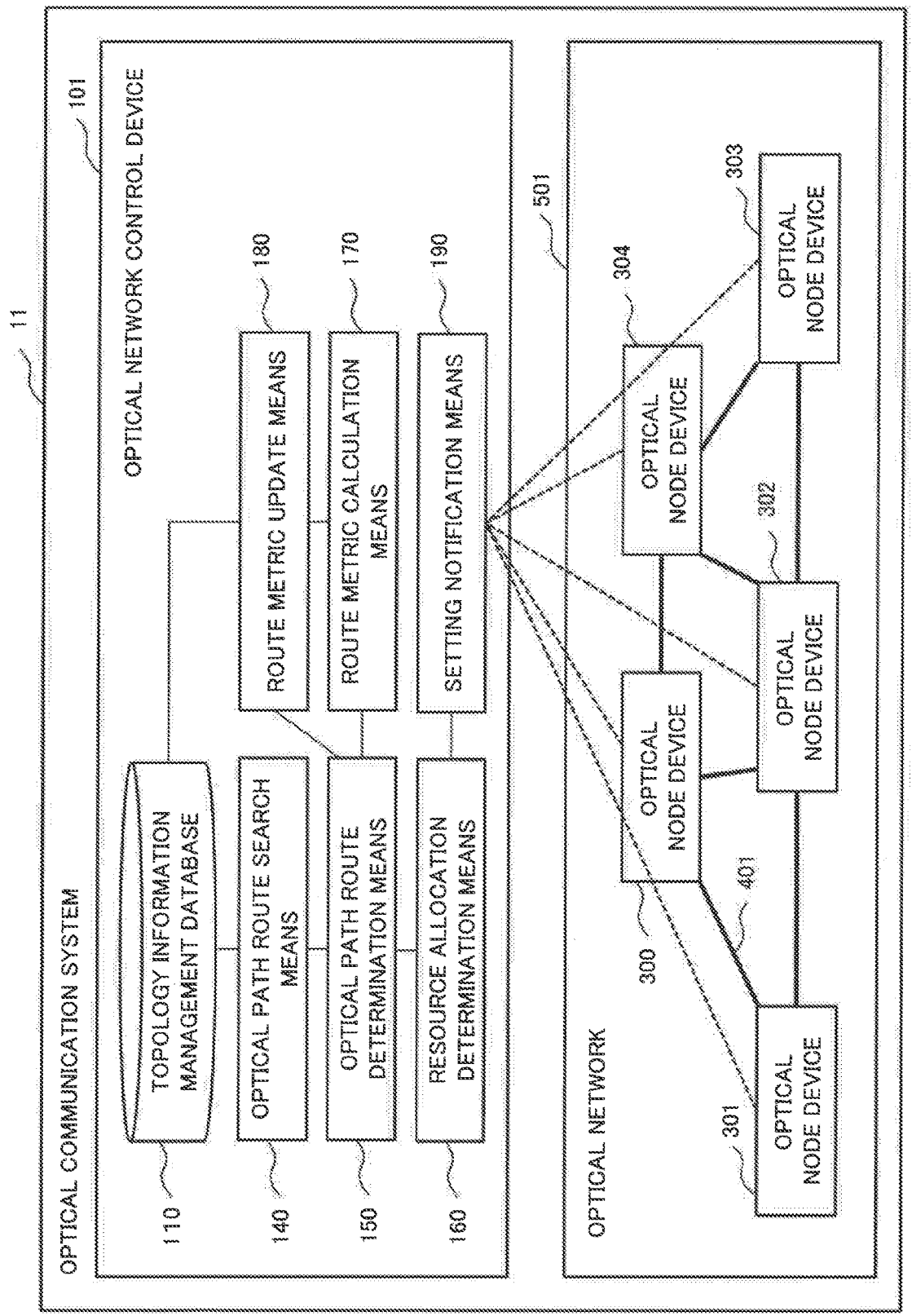
FIG. 3 is a block diagram illustrating a configuration of an optical communication system according to a second example embodiment of the present invention.

Next, a second example embodiment of the present invention is described. FIG. 3 illustrates a configuration of an optical communication system 11 according to the present example embodiment. As illustrated in the figure, the optical communication system 11 includes an optical network control device 101 and an optical network 501.

FIG. 3 illustrates an example in which five optical node devices 300 to 304 are connected by an optical fiber transmission line 401 and configure the optical network 501.

The optical network control device 101 according to the present example embodiment includes a topology information management database 110, an optical path route search means 140, an optical path route determination means 150, a resource allocation determination means 160, a route metric calculation means 170, a route metric update means 180, and a setting notification means 190.

The topology information management database 110 manages a connection relationship of the optical fiber transmission line 401 connecting optical node devices 300 to 304 that configure the optical network 501 and a route metric value, i.e., a route selection index value for the optical fiber transmission line 401.

The optical path route search means 140 refers to the route metric value and searches for a route linking a start point optical node device and an end point optical node device. The optical path route determination means 150 determines a route having a minimum route metric value from among route candidates acquired by the optical path route search means 140. The resource allocation determination means 160 determines resource allocation for accommodating an optical path in the optical fiber transmission line 401 on the route determined by the optical path route determination means 150. Note that, the optical path route search means 140, the optical path route determination means 150, and the resource allocation determination means 160 configure a path setting means and a path selection means.

The route metric calculation means 170 calculates a route metric value according to a type of an optical path already accommodated in the optical fiber transmission line 401. Specifically, for the same requested traffic, a route metric value is increased, and setting can be made in such a way that a corresponding transmission line is not easily selected. The route metric update means 180 updates, based on the route metric value calculated by the route metric calculation means 170, a route metric value of the optical fiber transmission line 401 managed by the topology information management database 110. Note that the route metric calculation means 170 and the route metric update means 180 configure a topology information modification means.

The setting notification means 190 notifies the optical node devices 300 to 304 of resource allocation information including information of resource allocation determined by the resource allocation determination means 160 for an optical path.

Figure 4:
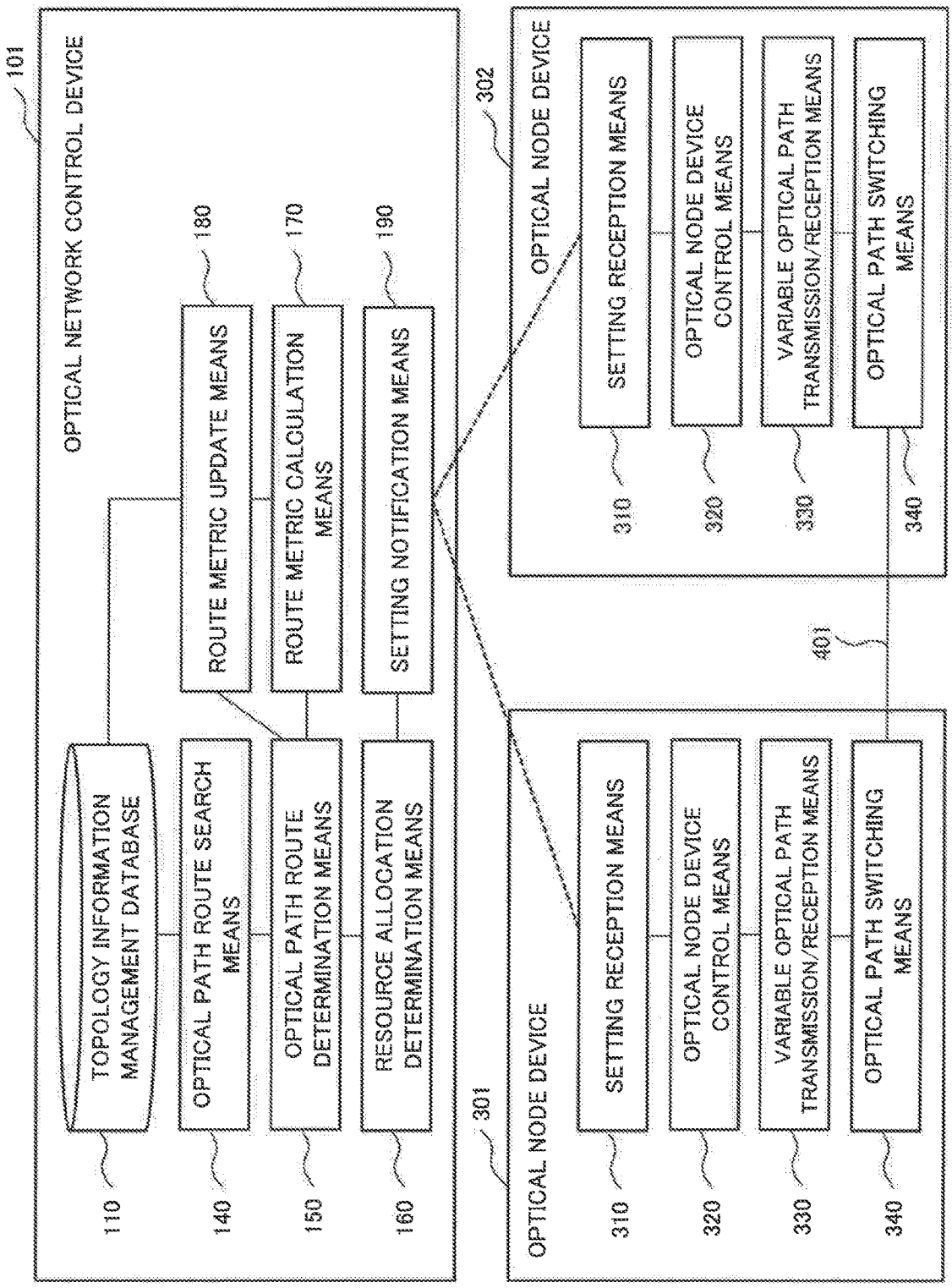
FIG. 4 is a block diagram illustrating a connection configuration of an optical network control device and an optical node device according to the second example embodiment of the present invention.

FIG. 4 illustrates a connection relationship between the optical network control device 101 according to the present example embodiment and the optical node devices 301 and 302 and a configuration of the optical node devices 301 and 302.

The optical node devices 300 to 304 each include a setting reception means (setting reception unit) 310, an optical node device control means (optical node device control unit) 320, a variable optical path transmission/reception means (variable optical path transmission/reception unit) 330, and an optical path switching means (optical path switching unit) 340.

The setting reception means 310 accepts the resource allocation information described above from the setting notification means 190 included in the optical network control device 101. The optical node device control means 320 controls, based on resource allocation information, the variable optical path transmission/reception means 330 and the optical path switching means 340. The variable optical path transmission/reception means 330 transmits signal light modulated based on a client signal that configures a requested traffic to the optical fiber transmission line 401. The optical path switching means 340 switches an optical fiber transmission line to be connected based on resource allocation information.

Next, an operation of the optical network control device 101 according to the present example embodiment is described. FIG. 5 is a flowchart for illustrating an operation of the optical network control device 101 according to the present example embodiment.

The optical network control device 101 first reads one requested traffic (step S10) and searches for a route of the optical network 501 in accordance with a required number of optical paths that accommodate the requested traffic (step S20).

In the route search step S20, first, the optical path route search means 140 searches for, with respect to the read requested traffic, a route having a minimum route metric value (first route selection index value) from among route candidates linking a start point optical node device and an end point optical node device (step S201). As a route metric value, communication quality of an optical fiber transmission line, i.e., a communication channel distance, the number of hops, an optical signal-to-noise ratio (OSNR), and the like can be used. At that time, as a route search algorithm, a linear programming, a k-th shortest path search method, a genetic algorithm, and the like can be used.

The optical path route determination means 150 determines a route of the optical path, based on the route search result in step S201 (step S202).

Next, it is determined whether the number of optical path routes determined so far is sufficient or not for a required number of optical path routes, i.e., whether search has succeeded or not (step S203).

When the determined number of optical path routes is insufficient for a required number of optical path routes (step S203/NO), the route metric calculation means 170 calculates a route metric value (second route selection index value) according to a type of an optical path already accommodated in an optical path transmission line (step S204). As a type of an optical path, quality of service (QoS) of a requested traffic, a bandwidth guarantee rate, a bandwidth occupancy-type or bandwidth sharing-type optical path protection type, and the like can be used.

A route metric value used here can be calculated by calculating a linear sum of a transmission line quality value that is communication quality specific to an optical fiber transmission line and an optical path specific value that is a numerical value previously set for each optical path or a product of a transmission line quality value and an optical path specific value. Further, the route metric value can be also calculated by replacing a transmission line quality value with an optical path specific value. As a transmission line quality value, for example, a route length can be used. Further, as an optical path specific value, for example, a route metric value of an optical path (route-determined optical path) where a route is already determined can be used. Herein, a route metric value of a route-determined optical path can be set, for example, as a total sum of transmission line quality values of optical fiber transmission lines that accommodate a route-determined optical path.

Next, the route metric update means 180 reflects the route metric value calculated in step S204 in the topology information management database 110 and updates a route metric value (step S205). Thereafter, the optical path route search means 140 searches again for a route having a minimum updated route metric value from among route candidates (step S201).

On the other hand, when the number of optical path routes determined so far is sufficient for a required number of optical path routes (step S203/YES), the resource allocation determination means 160 calculates a required number of wavelength slots for each optical path route (step S30) and determines allocation of a wavelength resource (step S40). At that time, the resource allocation determination means 160 calculates a required number of wavelength slots, based on communication quality of an optical fiber transmission line and reachability of an optical path. Further, disposition of a regenerative repeater may be calculated, as necessary.

The operation described above (steps S10 to S40) is executed for all requested traffics (step S50/YES), and thereby resource allocation information of an optical path is determined. The setting notification means 160 notifies the setting reception means 310 included in each of the optical node devices 300 to 304 of the resource allocation information thus determined (step S60).

In the optical node devices 300 to 304, the optical node device control means 320 controls the variable optical path transmission/reception means 330 and the optical path switching means 340, based on the notified resource allocation information. The variable optical path transmission/reception means 330 generates an optical path, based on the number of wavelength slots determined according to route quality of an optical path. The optical path switching means 340 controls a route, based on the notified resource allocation information and thereby allocates an optical path to the optical fiber transmission line 401. Through the operation described above, the optical node devices 300 to 304 are able to establish communication.

Next, allocation of an optical path among the optical node devices 300 to 304 for a requested traffic is described by using a specific example.

Figures 6A, 6B:
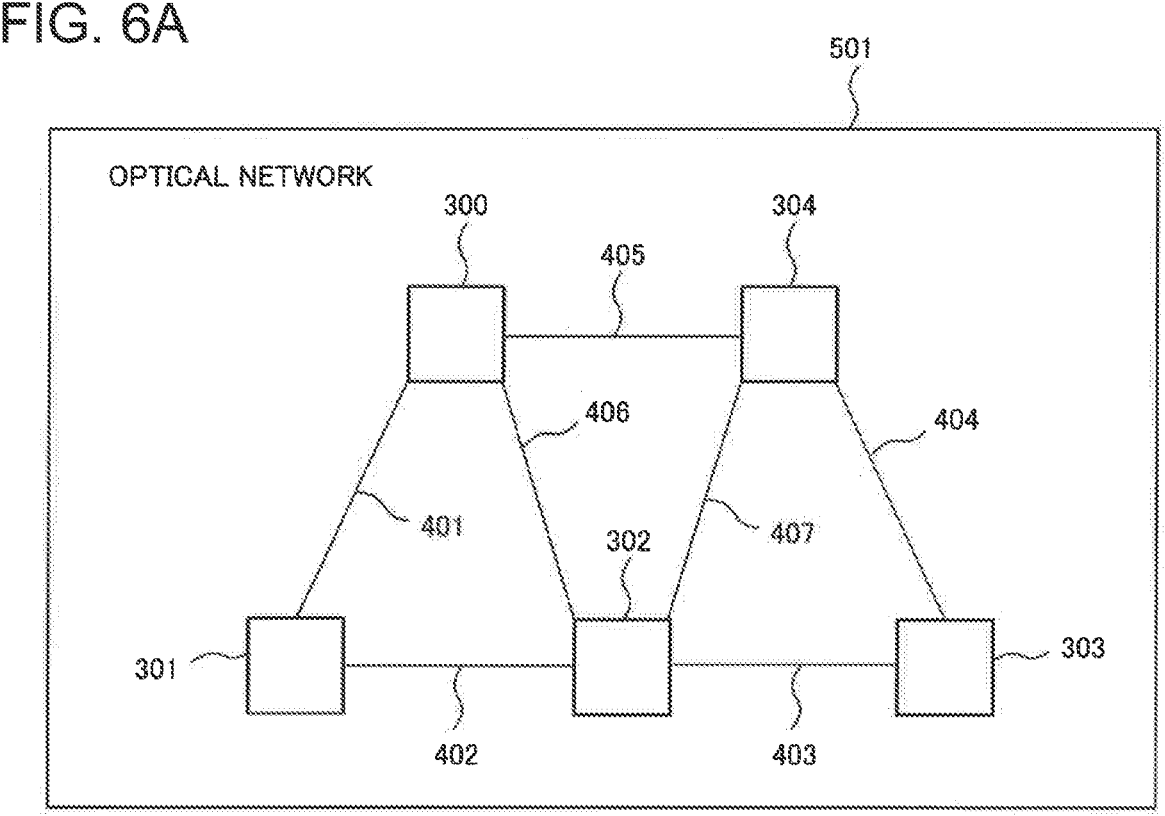
FIG. 6A is a block diagram illustrating a configuration of an optical network for illustrating an operation of the optical network control device according to the second example embodiment of the present invention.
FIG. 6B is a diagram illustrating a route metric value of an optical fiber transmission line that configures an optical network for illustrating an operation of the optical network control device according to the second example embodiment of the present invention.

FIG. 6A illustrates a configuration of an optical network 501 used in the following description. Here, in order to accommodate a requested traffic on the optical network 501, it is assumed that three optical paths in total are needed between the optical node device 301 and the optical node device 304. FIG. 6B illustrates an example of route metric values of optical fiber transmission lines 401 to 407 that configure the optical network 501. These route metric values are managed in the topology information management database 110.

Figures 6C, 6D:
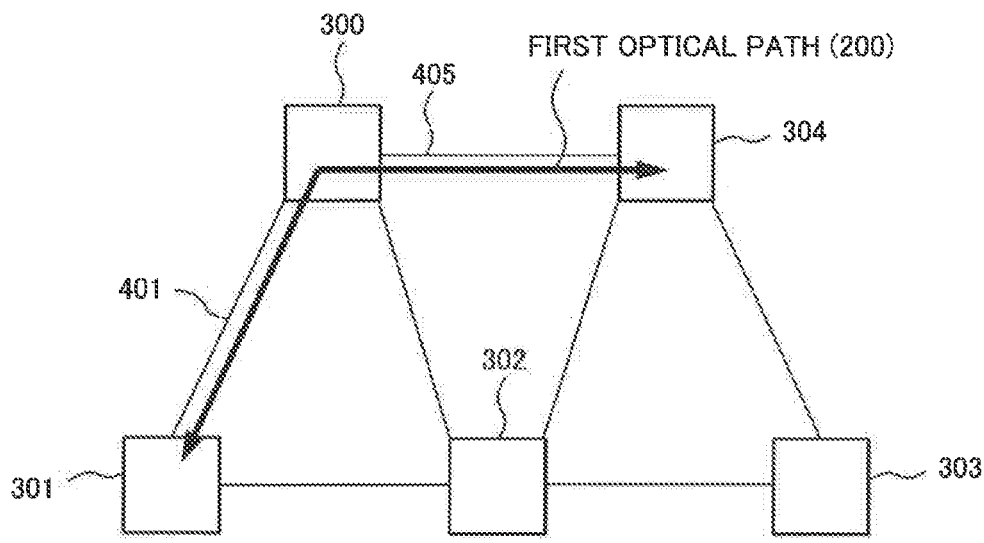
FIG. 6C is a block diagram illustrating a configuration of an optical network for illustrating an operation of the optical network control device according to the second example embodiment of the present invention and illustrates a state after determining a route of a first optical path.
FIG. 6D is a diagram illustrating a route metric value of an optical fiber transmission line that configures an optical network for illustrating an operation of the optical network control device according to the second example embodiment of the present invention and illustrates a value after determining a route of a first optical path.

From among the route metric values illustrated in FIG. 6B, a first optical path is allocated to a route having a minimum route metric value, i.e., a route passing through the optical fiber transmission line 401 and the optical fiber transmission line 405. Such state is illustrated in FIG. 6C. A route metric value of the first optical path allocated is 200 (100+100). The first optical path has been allocated, and thereby the route metric values of the optical fiber transmission line 401 and the optical fiber transmission line 405 are updated to values added with the route metric value (200) of the first optical path. Updated route metric values are illustrated in FIG. 6D.

Figures 6E, 6F:
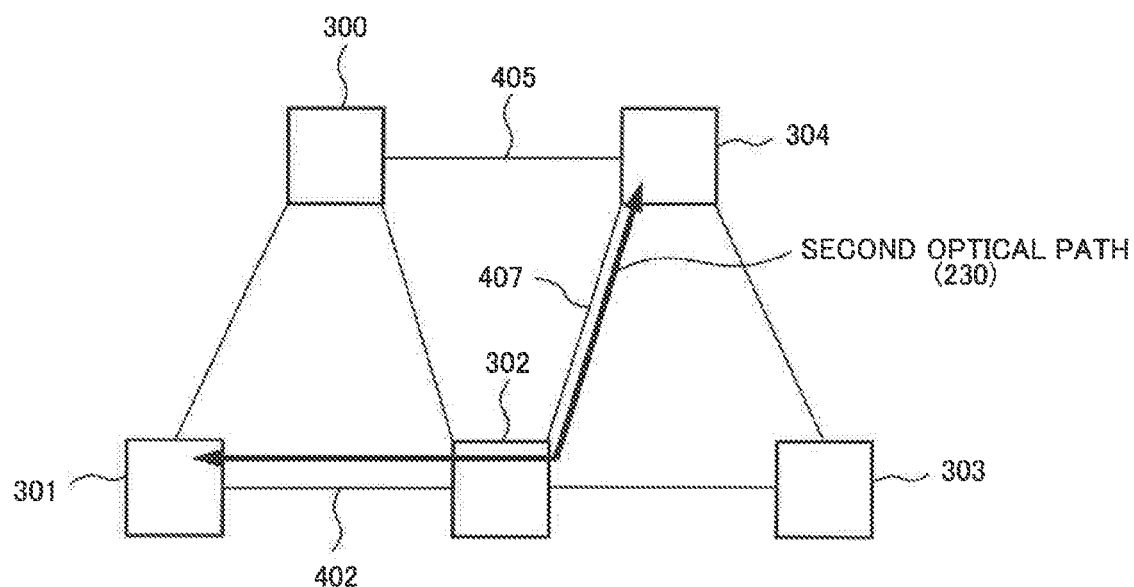
FIG. 6E is a block diagram illustrating a configuration of an optical network for illustrating an operation of the optical network control device according to the second example embodiment of the present invention and illustrates a state after determining a route of a second optical path.
FIG. 6F is a diagram illustrating a route metric value of an optical fiber transmission line that configures an optical network for illustrating an operation of the optical network control device according to the second example embodiment of the present invention and illustrates a value after determining a route of a second optical path.

A second optical path is allocated to a route having a minimum route metric value (FIG. 6D) updated after accommodation of the first optical path, i.e., a route passing through the optical fiber transmission line 402 and the optical fiber transmission line 407. Such state is illustrated in FIG. 6E. A route metric value of the second optical path allocated is 230 (80+150). The second optical path has been allocated, and thereby the route metric values of the optical fiber transmission line 402 and the optical fiber transmission line 407 are updated to values added with the route metric value (230) of the second optical path. Route metric values updated are illustrated in FIG. 6F.

Figure 6G:
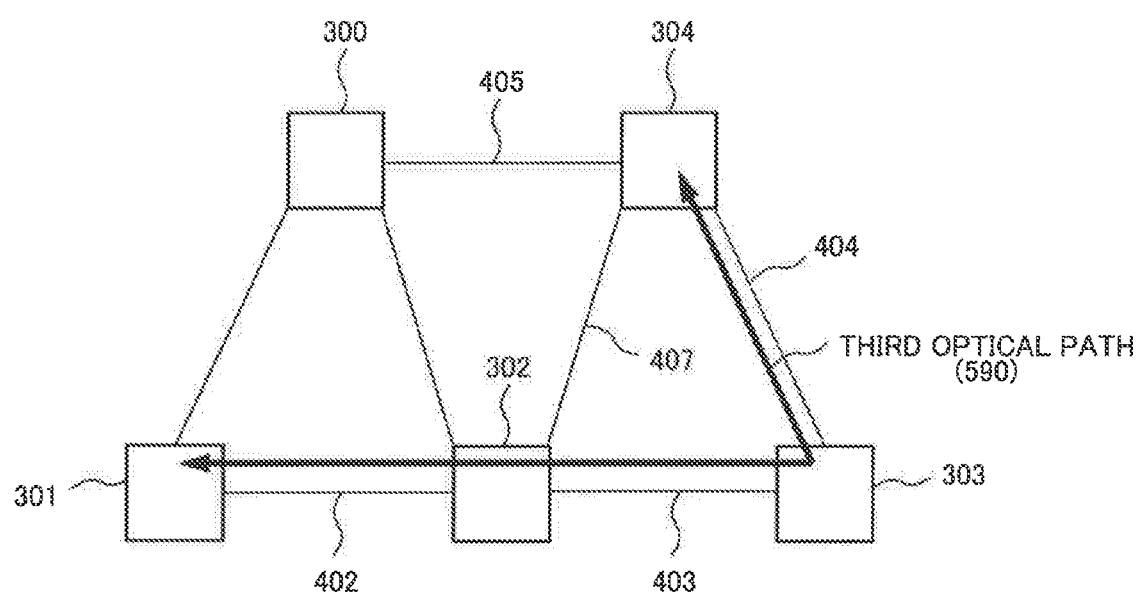
FIG. 6G is a block diagram illustrating a configuration of an optical network for illustrating an operation of the optical network control device according to the second example embodiment of the present invention and illustrates a state after determining a route of a third optical path.

A third optical path is allocated to a route having a minimum route metric value (FIG. 6F) updated after accommodation of the second optical path, i.e., the optical fiber transmission line 402, the optical fiber transmission line 403, and the optical fiber transmission line 404. Such state is illustrated in FIG. 6G.

In this manner, route search is executed for a requested traffic, and as a result, the three optical path routes described above are determined. For the three optical path routes, a required number of wavelength slots is calculated based on communication quality of the optical fiber transmission lines 401 to 407 and reachability of an optical path, and an allocation wavelength resource is determined. Further, disposition of a regenerative repeater may be calculated, as necessary.

Note that, the first optical path and the second optical path described above may be allocated to independent physical routes by using a route search algorithm for searching for physical routes independent of each other, e.g. a Suurballe algorithm or a Bhandari algorithm. Thereafter, a third optical path can be allocated based on the present example embodiment.

As described above, according to the optical network control device 101 of the present example embodiment, a route having a minimum route metric value of an optical path is selected, and thereby a route having maximum route diversity can be selected. Therefore, while an increase in a calculation time for allocating a standby-system optical path is reduced, rapid recovery from faults in a plurality of locations of an optical network can be achieved.

Third Example Embodiment

Figure 7:
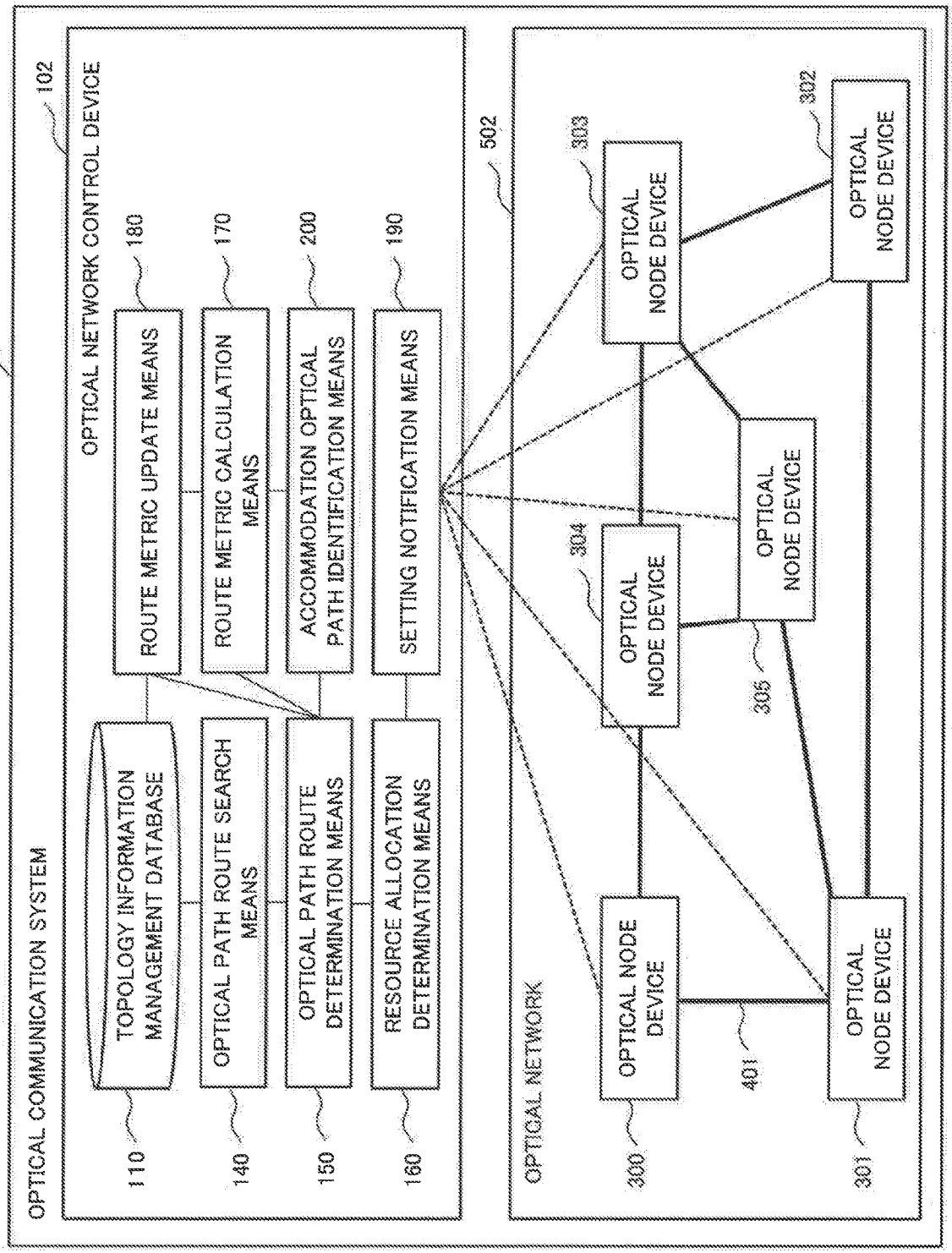
FIG. 7 is a block diagram illustrating a configuration of an optical communication system according to a third example embodiment of the present invention.

Next, a third example embodiment of the present invention is described. FIG. 7 illustrates a configuration of an optical communication system 12 according to the present example embodiment. As illustrated in the figure, the optical communication system 12 includes an optical network control device 102 and an optical network 502.

FIG. 7 illustrates an example in which six optical node devices 300 to 305 are connected by an optical fiber communication channel 401 and configure the optical network 502.

The optical network control device 102 according to the present example embodiment includes a topology information management database 110, an optical path route search means 140, an optical path route determination means 150, a resource allocation determination means 160, a route metric calculation means 170, a route metric update means 180, and a setting notification means 190. The configuration up to here is similar to the configuration of the optical network control device 101 according to the second example embodiment.

The optical network control device 102 according to the present example embodiment further includes an accommodation optical path identification means (accommodation optical path identification unit) 200. The accommodation optical path identification means 200 identifies whether or not there is an optical path that accommodates the same requested traffic as a requested traffic accommodated by an optical path that is a target for route search among optical paths already allocated to an optical fiber transmission line on a route candidate searched by the optical path route search means 140. The route metric calculation means 170 calculates, according to an identification result, a route metric value for an optical fiber transmission line of a route candidate of the corresponding optical path.

Figure 8:
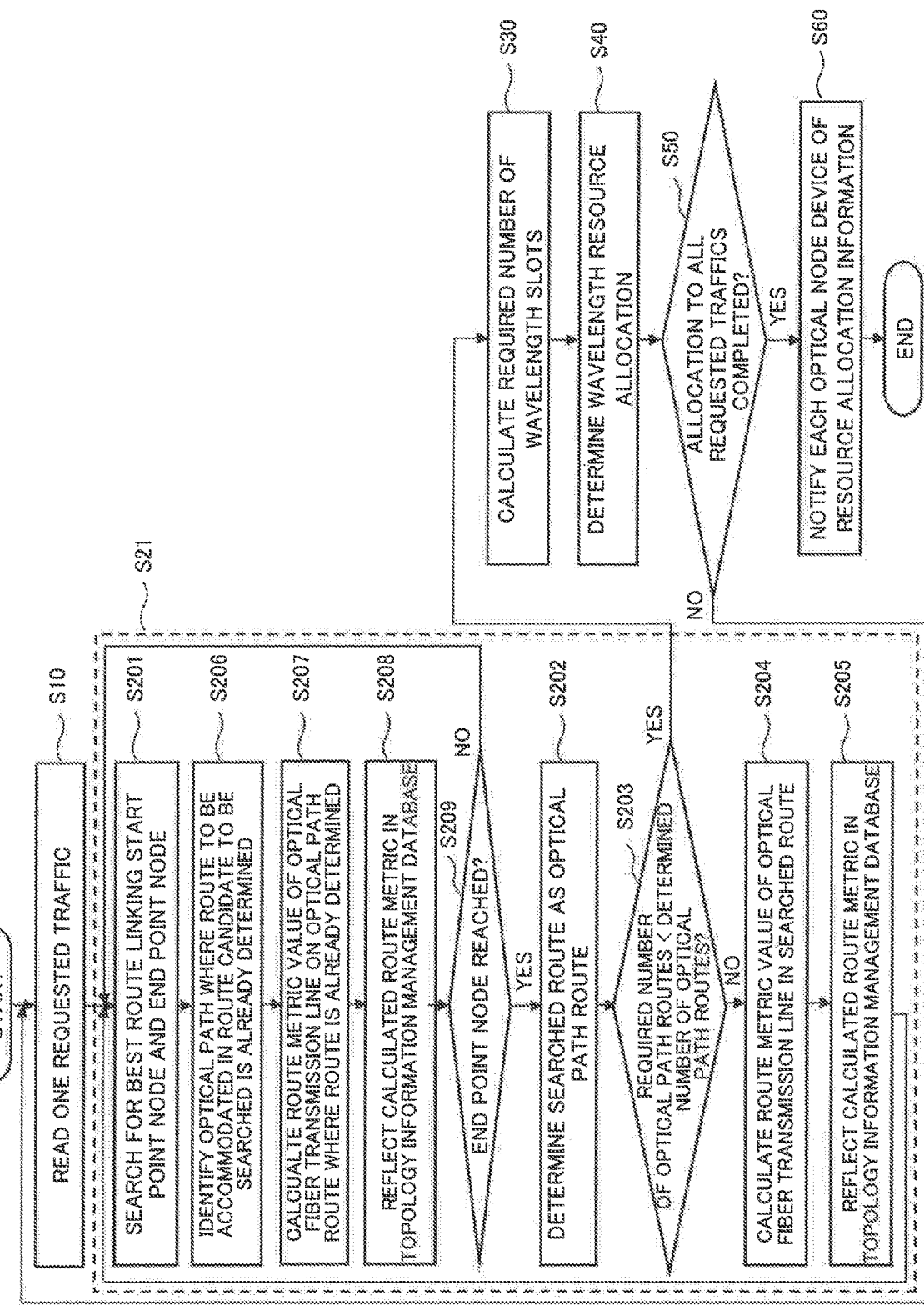
FIG. 8 is a flowchart illustrating an operation of an optical network control device according to the third example embodiment of the present invention.

Next, an operation of the optical network control device 102 according to the present example embodiment is described. FIG. 8 is a flowchart for illustrating an operation of the optical network control device 102 according to the present example embodiment.

The optical network control device 102 first reads one requested traffic (step S10) and searches for a route of the optical network 502 in accordance with a required number of optical paths that accommodate the requested traffic (step S21).

In the route search step S21, first, the optical path route search means 140 searches for, with respect to the read requested traffic, a route having a minimum route metric value from among route candidates linking a start point optical node device and an end point optical node device (step S201). As a route metric value, communication quality of an optical fiber transmission line, i.e., a communication channel distance, the number of hops, an optical signal-to-noise ratio (OSNR), and the like can be used. At that time, as a route search algorithm, a linear planning method, a k-th shortest route search method, a genetic algorithm, and the like can be used. Here, an operation upon using a k-th shortest route search method is described.

The optical path route search means 140 starts route search from a start point optical node device. The accommodation optical path identification means 200 identifies, for each search step, an optical path where a route to be accommodated in a route candidate to be searched is already determined (step S206). In other words, the accommodation optical path identification means 200 identifies whether an already-set optical path to be accommodated in a route candidate to be searched is an optical path that accommodates the same requested traffic or not.

The route metric calculation means 170 calculates, based on an identification result acquired by the accommodation optical path identification means 200, a route metric value on an optical path route where a route is already determined (step S207). A route metric value used here can be calculated by calculating a linear sum of a transmission line quality value that is communication quality specific to an optical fiber transmission line and an optical path specific value that is a numerical value previously set for each optical path or a product of a transmission line quality value and an optical path specific value. Further, the route metric value can be also calculated by replacing a transmission line quality value with an optical path specific value.

The route metric update means 180 reflects the route metric value calculated in step S207 in the topology information management database 110 and updates a route metric value (step S208).

Subsequently, it is determined whether or not a route that reaches an end point optical node device has been acquired by route search (step S209). When an end point optical node device is not reached (step S209/NO), the route search step continues (step S201). On the other hand, when a route that reaches an end point optical node device has been acquired (step S209/YES), the optical path route determination means 150 determines the searched route as an optical path route (step S202).

Next, it is determined whether the number of optical path routes determined so far is sufficient for a required number of optical path routes or not, i.e., whether search has succeeded or not (step S203).

When the determined number of optical path routes is insufficient for a required number of optical path routes (step S203/NO), the route metric calculation means 170 calculates a route metric value according to a type of an optical path already accommodated in an optical fiber transmission line (step S204). A route metric value used here can be calculated by calculating a linear sum of a transmission line quality value that is communication quality specific to an optical fiber transmission line and an optical path specific value that is a numerical value previously set for each optical path or a product of a transmission line quality value and an optical path specific value. Further, the route metric value can be also calculated by replacing a transmission line quality value with an optical path specific value.

The route metric update means 180 reflects the route metric value calculated in step S204 in the topology information management database 110 and updates a route metric value (step S205). Thereafter, the optical path route search means 140 searches again for a route having a minimum updated route metric value from among route candidates (step S201).

On the other hand, when the number of optical path routes determined so far is sufficient for a required number of optical path routes (step S203/YES), the resource allocation determination means 160 calculates a required number of wavelength slots for each optical path route (step S30), and determines allocation of a wavelength resource (step S40). At that time, the resource allocation determination means 160 calculates a required number of wavelength slots, based on communication quality of an optical fiber transmission line and reachability of an optical path. Further, disposition of a regenerative repeater may be calculated, as necessary.

The operation described above (steps S10 to S40) is executed for all requested traffics (step S50/YES), and thereby resource allocation information of an optical path is determined. The setting notification means 160 notifies the setting reception means 310 included in each of the optical node devices 300 to 305 of the resource allocation information thus determined (step S60).

In the optical node devices 300 to 305, the optical node device control means 320 controls the variable optical path transmission/reception means 330 and the optical path switching means 340, based on the notified resource allocation information. The variable optical path transmission/reception means 330 generates an optical path, based on the number of wavelength slots determined according to route quality of an optical path. The optical path switching means 340 controls a route, based on the notified resource allocation information, and thereby allocates an optical path to the optical fiber transmission line 401. Through the operation described above, the optical node devices 300 to 305 establish communication.

Next, allocation of an optical path among the optical node devices 300 to 305 for a requested traffic is described by using a specific example.

Figure 9A:
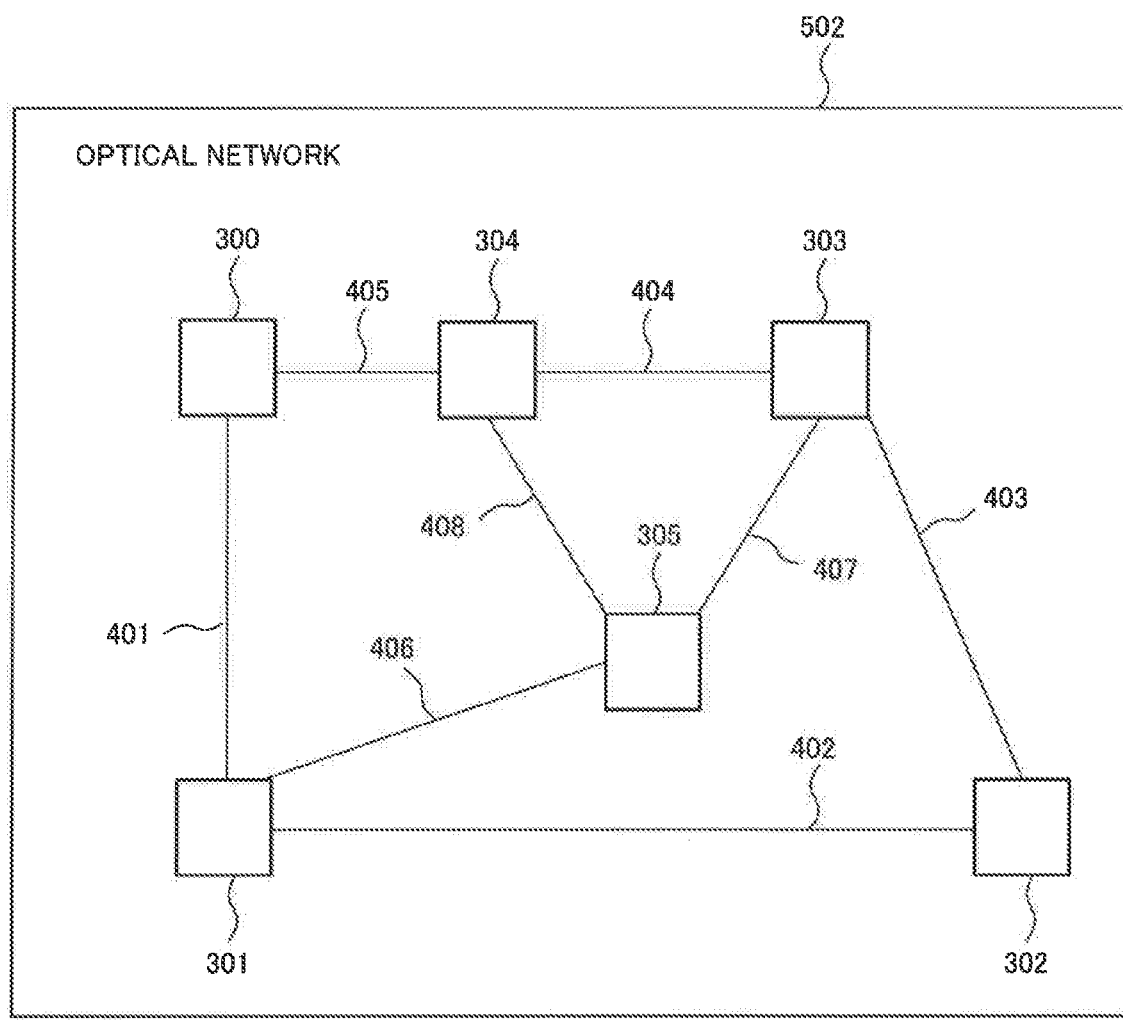
FIG. 9A is a block diagram illustrating a configuration of an optical network for illustrating an operation of the optical network control device according to the third example embodiment of the present invention.

FIG. 9A illustrates a configuration of the optical network 502 to be used in the following description. Here, in order to accommodate a requested traffic on the optical network 502, it is assumed that three optical paths in total are needed between the optical node device 300 and the optical node device 302. FIG. 9B illustrates an example of route metric values of the optical fiber transmission lines 401 to 408 that configure the optical network 502. These route metric values are managed in the topology information management database 110.

Figures 9C, 9D:
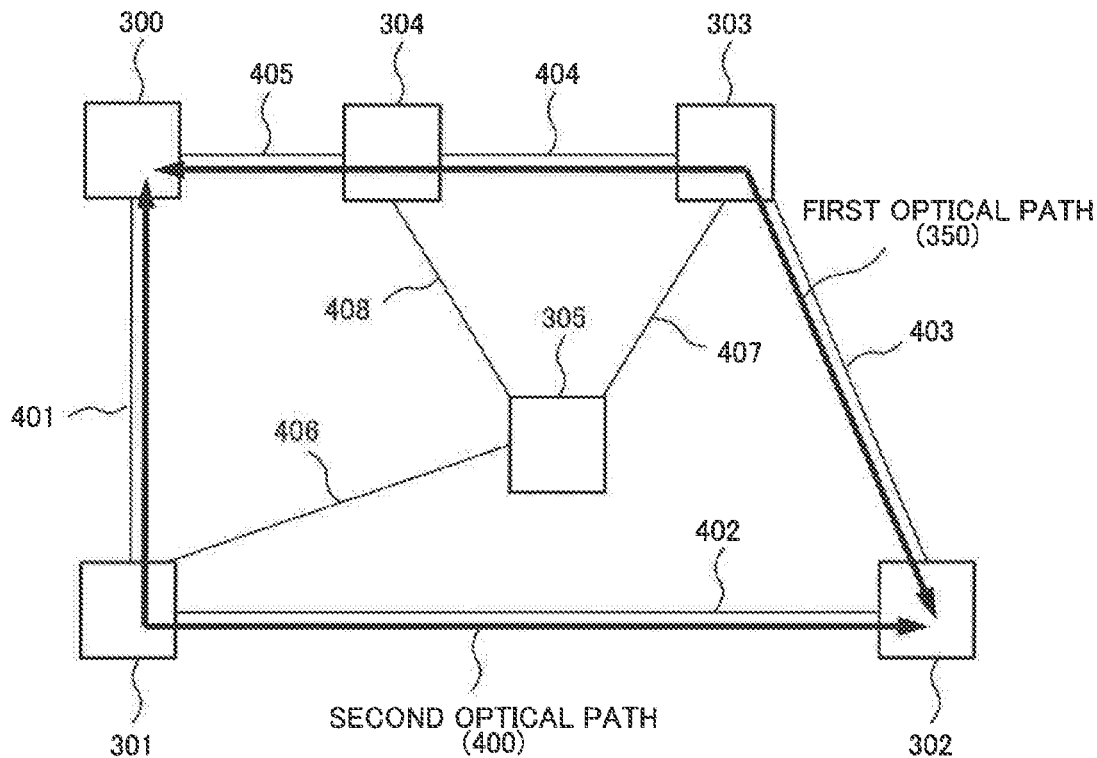
FIG. 9C is a block diagram illustrating a configuration of an optical network for illustrating an operation of the optical network control device according to the third example embodiment of the present invention and illustrates a state after determining routes of a first optical path and a second optical path.
FIG. 9D is a diagram illustrating a route metric value of an optical fiber transmission line that configures an optical network for illustrating an operation of the optical network control device according to the third example embodiment of the present invention and illustrates a value after determining routes of a first optical path and a second optical path.

From among the route metric values illustrated in FIG. 9B, a first optical path is allocated to a route having a minimum route metric value, i.e., a route passing through the optical fiber transmission lines 403, 404, and 405. Such state is illustrated in FIG. 9C. A route metric value of the first optical path allocated is 350 (170+100+80). The first optical path has been allocated, and thereby the route metric values of the optical fiber transmission lines 403, 404, and 405 are updated to values added with the route metric value (350) of the first optical path.

Subsequently, a second optical path is allocated to a route having a minimum route metric value updated, i.e., a route passing through the optical fiber transmission line 401 and the optical fiber transmission line 402 (see FIG. 9C). A route metric value of the second optical path allocated is 400 (150+250). Similarly to the case of the first optical path, the route metric values of the optical fiber transmission line 401 and the optical fiber transmission line 402 that accommodate the second optical path are updated to values added with the route metric value (400) of the second optical path. Route metric values updated after allocation of the first optical path and the second optical path are illustrated in FIG. 9D.

Next, for a third optical path that accommodates a requested traffic, route search is started from the starting point optical node device 300, based on route metric values described in FIG. 9D. At that time, from between the optical fiber transmission line 401 and the optical fiber transmission line 405 connected to the start point optical node device 300, the optical fiber transmission line 405 where a route metric value described in FIG. 9D is smaller is selected as a route candidate. Such state is illustrated in FIG. 9E.

Here it is already determined that the optical fiber transmission line 405 accommodates the first optical path. Therefore, the route metric calculation means 170 adds, for example, 375 that is an average value of route metric values of the first optical path and the second optical path to a route of the first optical path. In other words, route metric values of the optical fiber transmission line 403 and the optical fiber transmission line 404 that continue to be searched are updated among routes of the first optical path route. Route metric values updated in this manner are illustrated in FIG. 9F.

Figures 9E, 9F:
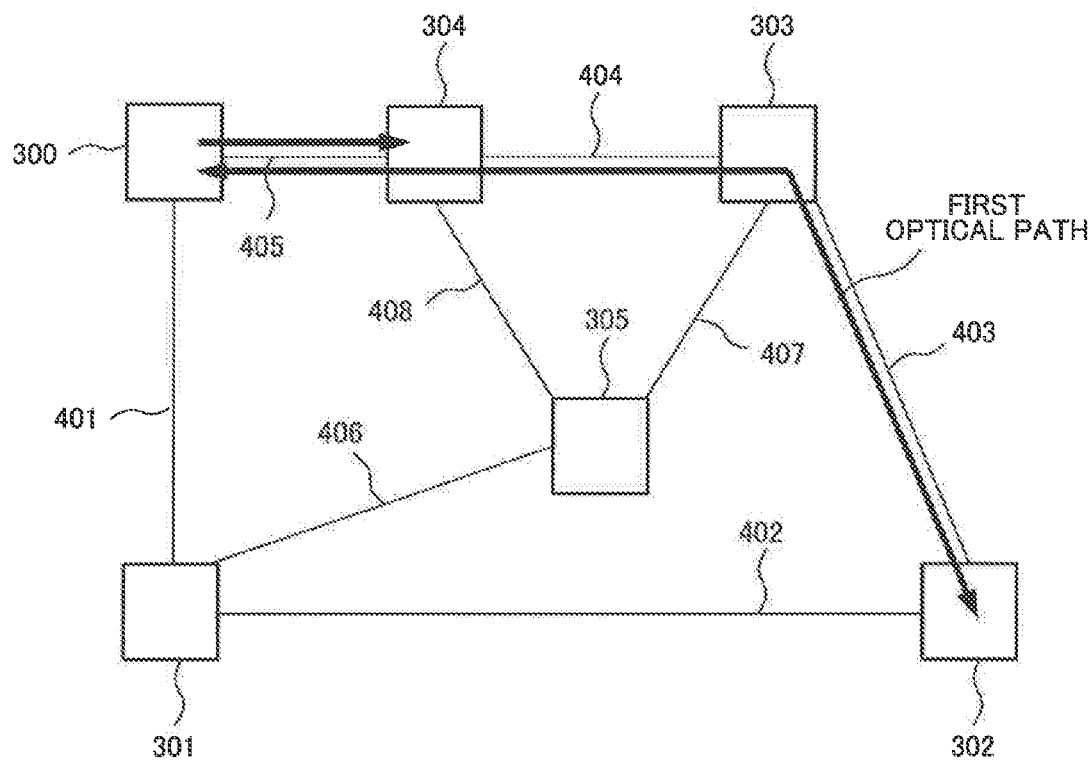
FIG. 9E is a block diagram illustrating a configuration of an optical network for illustrating an operation of the optical network control device according to the third example embodiment of the present invention and illustrates a state after starting route search for a third optical path.
FIG. 9F is a diagram illustrating a route metric value of an optical fiber transmission line that configures an optical network for illustrating an operation of the optical network control device according to the third example embodiment of the present invention and illustrates a value after update for an overlapping route.
Figure 9G:
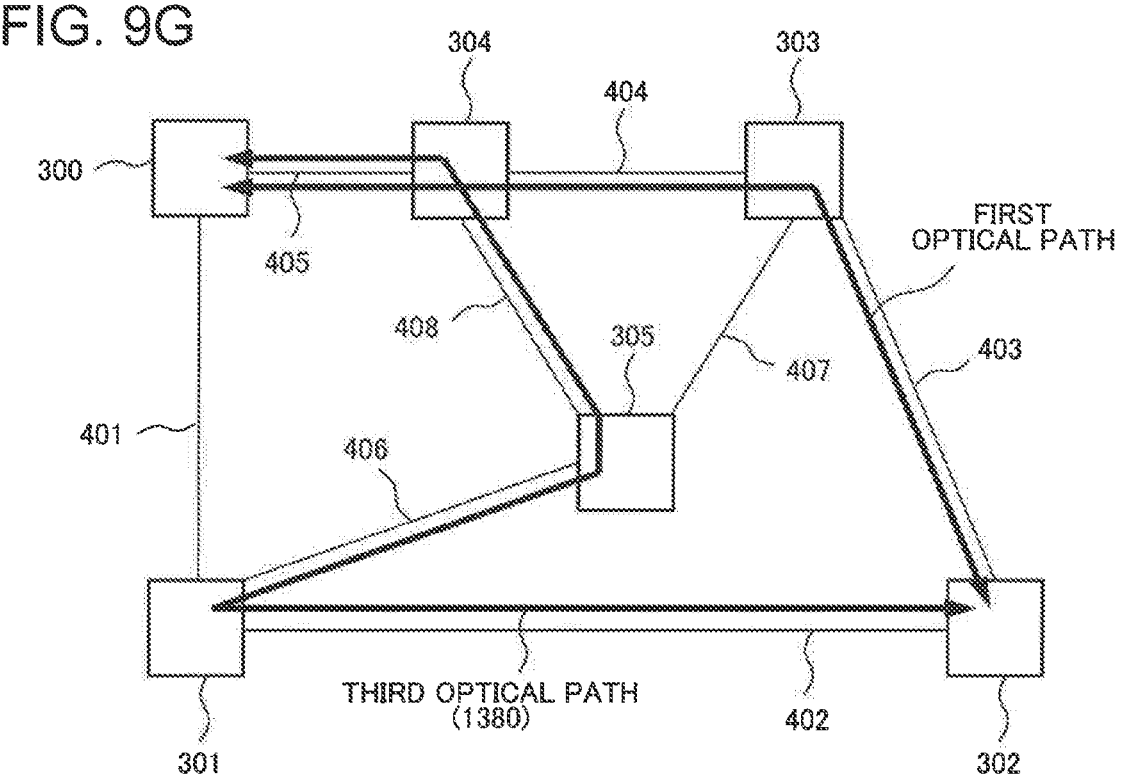
FIG. 9G is a block diagram illustrating a configuration of an optical network for illustrating an operation of the optical network control device according to the third example embodiment of the present invention and illustrates a state after determining a route of a third optical path.

Then, a third optical path is allocated to a route having a minimum route metric value updated described in FIG. 9F, i.e., a route passing through the optical fiber transmission lines 402, 405, 406, and 408. Such state is illustrated in FIG. 9G.

Figure 9H:
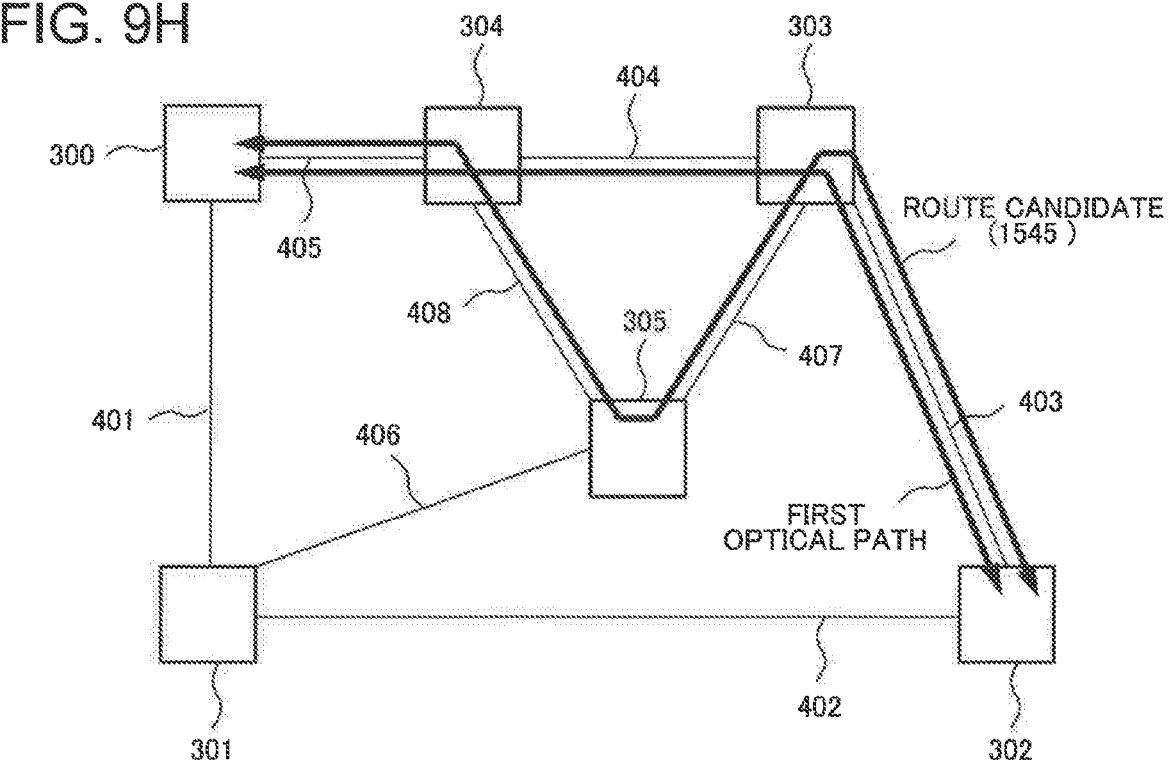
FIG. 9H is a block diagram illustrating a configuration of an optical network for illustrating an operation of the optical network control device according to the third example embodiment of the present invention and illustrates a route candidate upon no update of a route metric value for an overlapping route.

FIG. 9H illustrates an example of a route search result in which the optical path identification means 200 is not included. A route candidate of this case is a route passing through the optical fiber transmission lines 403, 405, 407, and 408. In the route candidate, there are a large number of transmission line sections overlapping with a route of a first optical path that accommodates the same requested traffic. Therefore, when a fault occurs in an optical fiber transmission line, a probability that a first optical path and a third optical path are disrupted at the same time is high.

In contrast, when the optical path identification means 200 according to the present example embodiment is included, a route metric value of an optical fiber transmission line overlapping with a route of a first optical path where a route is already determined is updated. Therefore, a route metric value of a route candidate illustrated in FIG. 9H is calculated as 1545. The route metric value is larger than a route metric value (1380) for a route of a third optical path illustrated in FIG. 9G, and therefore, according to the present example embodiment, the route candidate illustrated in FIG. 9H is not selected as a route of the third optical path.

In this manner, route search is executed for a requested traffic, and as a result, the three optical path routes described above are determined. Then, for the three optical path routes, a required number of wavelength slots is calculated based on communication quality of the optical fiber transmission lines 401 to 408 and reachability of an optical path, and an allocation wavelength resource is determined. Further, disposition of a regenerative repeater may be calculated, as necessary.

As described above, according to the optical network control device 102 of the present example embodiment, a route where route diversity is maximum and overlapping with an optical path that accommodates the same requested traffic is minimum can be selected. Therefore, while an increase in a calculation time for allocating a standby-system optical path is reduced, rapid recovery from faults in a plurality of locations of an optical network can be achieved.

Fourth Example Embodiment

Figure 10:
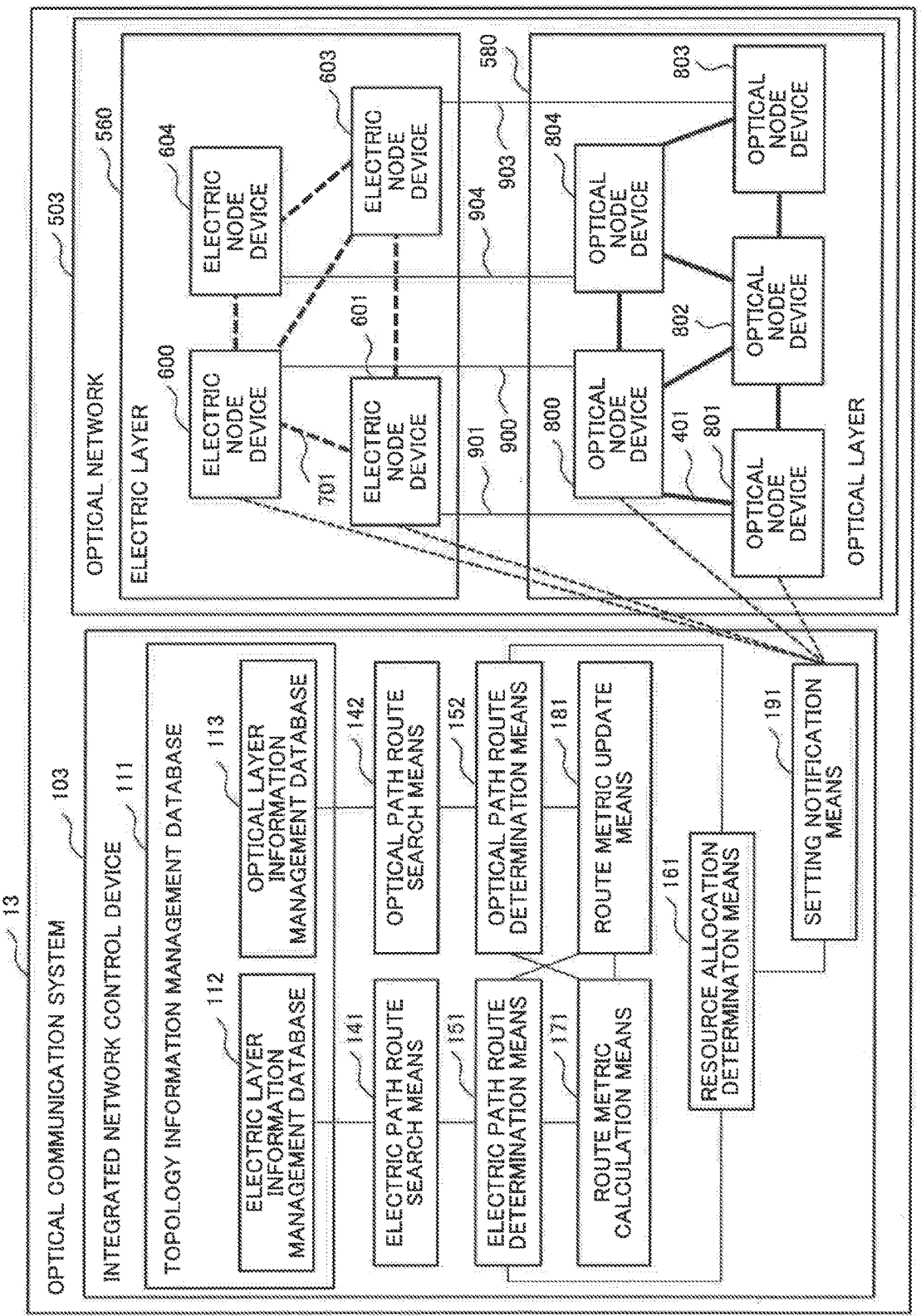
FIG. 10 is a block diagram illustrating a configuration of an optical communication system according to a fourth example embodiment of the present invention.

Next, a fourth example embodiment of the present invention is described. FIG. 10 illustrates a configuration of an optical communication system 13 according to the present example embodiment. As illustrated in the figure, the optical communication system 13 includes an integrated network control device 103 and an optical network 503.

In the example illustrated in FIG. 10, four electric node devices 600 to 603 are connected by a logical link 701 and configure an electric layer 560. Further, five optical node devices 800 to 804 are connected by an optical fiber transmission line 401 and configure an optical layer 580. The electric node devices 600 to 603 and the optical node devices 800, 801, 803, and 804 are connected by client signal lines 900, 901, 903, and 904, respectively, and configure the optical network 503.

The integrated network control device 103 according to the present example embodiment includes a topology information management database (DB) 111, an electric path route search means 141, an optical path route search means 142, an electric path route determination means 151, and an optical path route determination means 152. Further, the integrated network control device 103 includes a resource allocation determination means 161, a route metric calculation means 171, a route metric update means 181, and a setting notification means 191.

Here, the topology information management database 111 includes an electric layer information management database 112 and an optical layer information management database 113.

The electric layer information management database 112 manages a connection relationship of the logical link 701 among the electric node devices 600 to 603 that configure the electric layer 560 and a logical route metric value for the client signal lines 900, 901, 903, and 904 and the logical link 701. The optical layer information management database 113 manages a connection relationship of the optical fiber transmission line 401 connecting the optical node devices 800 to 804 that configure the optical layer 580 and a physical route metric value for the optical fiber transmission line 401.

The electric path route search means 141 refers to a logical route metric value (logical route selection index value) and searches for a logical route on the logical link 701 linking a start point node and an end point node. The optical path route search means 142 searches for a physical route on the optical fiber transmission line 401 corresponding to the logical link 701, based on a physical route metric value.

The electric path route determination means 151 determines a route having a minimum logical route metric value from among logical route candidates acquired by the electric path route search means 141. The optical path route determination means 152 determines a physical route corresponding to the logical link 701 and updates a correspondence relationship between a logical link and a physical route managed by the electric layer information management database 112.

The resource allocation determination means 161 accommodates an electric path in a logical route determined by the electric path route determination means 151 and determines resource allocation for accommodating an optical path on a physical route via a client signal line.

The route metric calculation means 171 calculates a route metric value for the logical link 701 including a physical route corresponding to a logical route that already accommodates an electric path. In other words, with regard to a logical link including a shared risk link group (SRLG) of the logical route, a logical route metric value is calculated. The route metric update means 181 updates a logical route metric value of the logical link 701 managed by the electric layer information management database 112, based on the route metric value calculated by the route metric calculation means 171 and sets the updated value as a modified logical route metric value (modified logical route setting index value).

The setting notification means 191 notifies the electric node devices 600 to 603 and the optical node devices 800 to 804 of resource allocation information determined by the resource allocation determination means 161.

Figure 11:
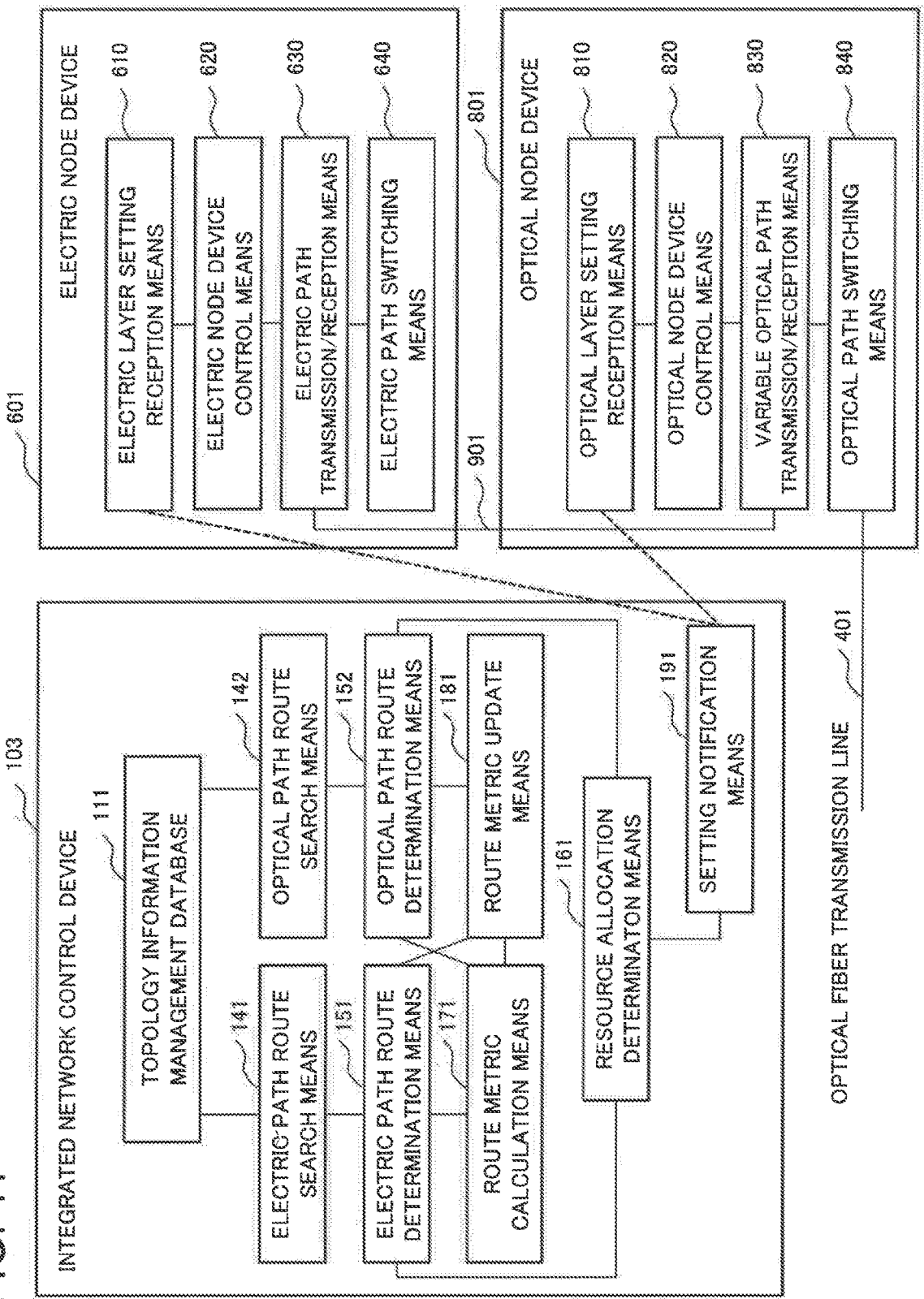
FIG. 11 is a block diagram illustrating a connection configuration among an integration network control device according to the fourth example embodiment of the present invention, an electric node device, and an optical node device.

FIG. 11 illustrates a connection relationship among the integrated network control device 103, the electric node device 601, and the optical node device 801 according to the present example embodiment and configurations of these devices.

The electric node devices 600 to 603 each include an electric layer setting reception means 610, an electric node device control means 620, an electric path transmission/reception means 630, and an electric path switching means 640.

The optical node devices 800 to 804 each include an optical layer setting reception means 810, an optical node device control means 820, a variable optical path transmission/reception means 830, and an optical path switching means 840.

Note that the electric path switching means 640 and the variable optical path transmission/reception means 830 are connected by the client signal line 901.

The electric layer setting reception means 610 receives resource allocation information from the setting notification means 191 included in the integrated network control device 103. The electric node device control means 620 controls the electric path transmission/reception means 630 and the electric path switching means 640, based on resource allocation information for an electric path. The electric path transmission/reception means 630 transmits/receives a plurality of client signals that configure a requested traffic via the electric path switching means 640. The electric path switching means 640 configures a plurality of client signals accommodated in an optical path. Then, the plurality of client signals are transferred to the variable optical path transmission/reception means 830 via the client signal line 901. Note that the electric path switching means 640 may provide logical route information to an electric path.

The optical layer setting reception means 810 accepts resource allocation information from the setting notification means 191 included in the integrated network control device 103. The optical node device control means 820 controls the variable optical path transmission/reception means 830 and the optical path switching means 840, based on resource allocation information for an optical path. The variable optical path transmission/reception means 830 transmits modulated signal light modulated based on the plurality of client signals described above to the optical fiber transmission line 401. The optical path switching means 840 switches an optical fiber transmission line to be connected based on resource allocation information of an optical path. The optical node device control means 820 is also able to execute switching to the optical fiber transmission line 401 that configures a corresponding physical route by controlling the optical path switching means 840, based on logical route information provided to an electric path.

Figure 12:
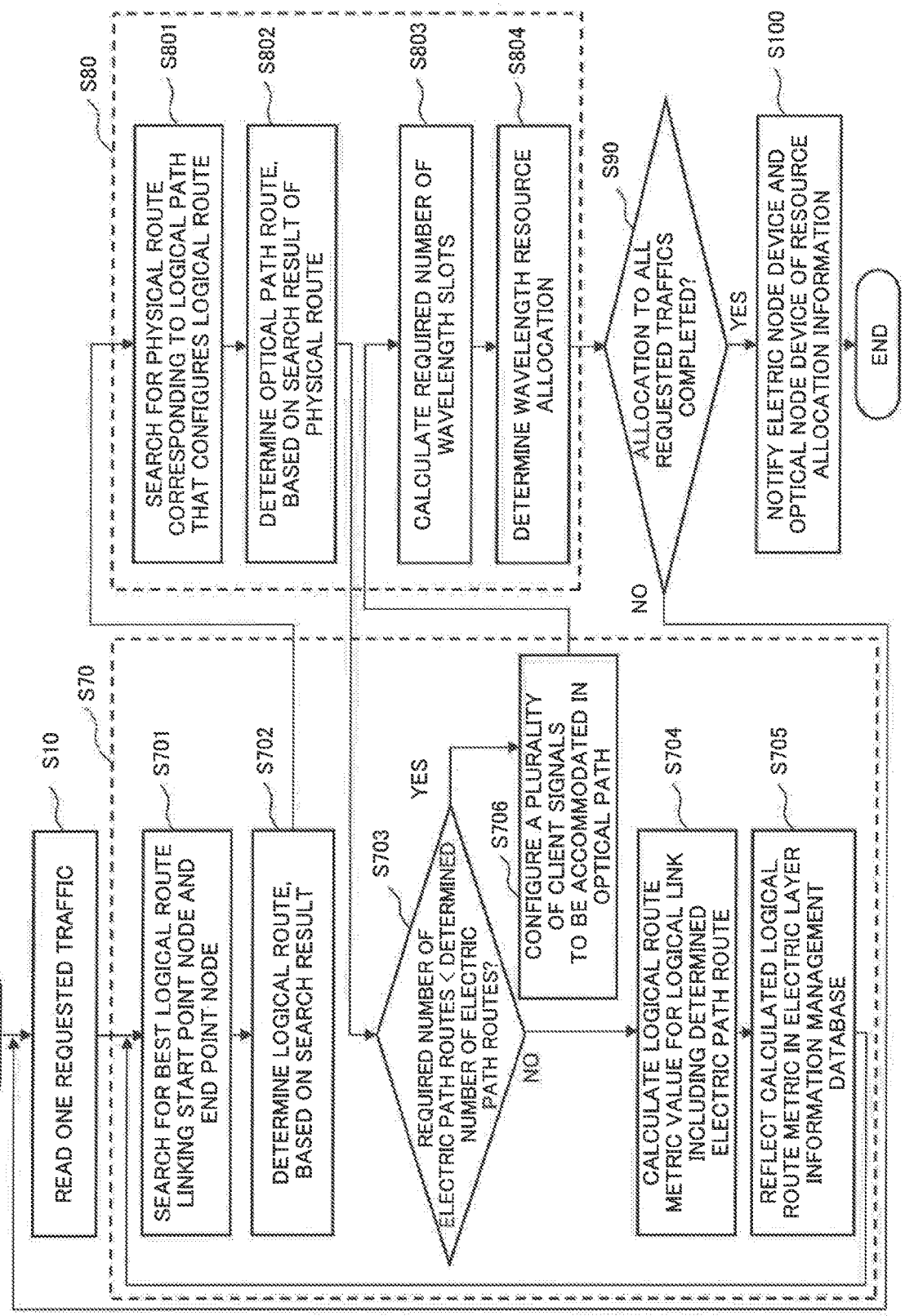
FIG. 12 is a flowchart illustrating an operation of an optical network control device according to the fourth example embodiment of the present invention.

Next, an operation of the integrated network control device 103 according to the present example embodiment is described. FIG. 12 is a flowchart for illustrating an operation of the integrated network control device 103 according to the present example embodiment. The integrated network control device 103 first reads one requested traffic (step S10) and searches for a logical route that accommodates a client signal that configures the requested traffic in the electric layer 560 (step S70).

In the logical route search step S70, first, the electric path route search means 141 searches for a route having a minimum logical route metric value from among logical route candidates linking a start point node and an end point node for the read requested traffic (step S701). As a logical route metric value, a physical route metric value for a physical route that configures the logical link 701, an accommodation traffic capacity of the logical link 701, a logical path usage rate, a logical path delay amount, a shared risk link group (SRLG), and the like can be used. At that time, as a route search algorithm, a linear planning method, a k-th shortest route search method, a genetic algorithm, and the like can be used.

The electric path route determination means 151 determines a logical route, based on a search result in step S701 (step S702). Note that, in an electric node device, a node restriction such as a shared risk group (SRG) can be taken into consideration by being reflected in a logical route metric value of a logical link connected to the node. In this case, in order that orders of an average value of logical route metric values and an increased portion of the logical route metric value based on a node restriction are matched with each other, the increased value is preferably linearly multiplied.

Then, the optical path route search means 142 searches for a physical route corresponding to the logical path 701 that configures a logical route (step S801). As a physical route metric value used here, communication quality of an optical fiber transmission line, i.e., a communication channel distance, the number of hops, an optical signal-to-noise ratio, and the like can be used. The optical path route determination means 152 determines an optical path route, based on a search result of a physical route in step S801 (step S802).

Next, it is determined whether the number of electric path routes determined so far is sufficient or not for a required number of electric path routes, i.e., whether search has succeeded or not (step S703).

When the determined number of electric path routes is insufficient for a required number of electric path routes (step S703/NO), the route metric calculation means 171 calculates a logical route metric value for the logical link 701 including a physical route corresponding to a logical route of an already-accommodated electric path (step S704). A logical route metric value used herein can be calculated by calculating a linear sum of a logical link quality value that is original logical link quality and an electric path specific value that is a numerical value previously set for each electric path or a product of a logical link quality value and an electric path specific value. Further, the logical route metric value can be also calculated by replacing a logical link quality value with an electric path specific value. As an electric path specific value, for example, a logical route metric of an electric path can be used.

Next, the route metric update means 181 reflects the logical route metric value calculated in step S704 in the electric layer information management database 112 and updates a logical route metric value (step S705). Thereafter, the electric path route search means 141 searches again for a logical route having a minimum updated route metric value from among logical route candidates.

On the other hand, when the number of electric paths determined so far is sufficient for a required number of electric path routes (step S703/YES), a plurality of client signals to be accommodated in an optical path are configured for each logical route (step S706). The resource allocation determination means 161 calculates, for the plurality of client signals thus configured, a required number of wavelength slots, based on communication quality of an optical fiber transmission line and reachability of an optical path (step S803). Then, allocation of a wavelength resource is determined (step S804). Further, disposition of a regenerative repeater may be calculated, as necessary.

The operation described above (steps S10 to S80) is executed for all requested traffics (step S90/YES), and thereby resource allocation information of an optical path is determined. The setting notification means 191 notifies the electric layer setting reception means 610 included in each of the electric node devices 600 to 603 and the optical layer setting reception means 810 included in each of the optical node devices 800 to 804 of the resource information thus determined (step S100).

In the electric node device 601, the electric node device control means 620 controls the electric path transmission/reception means 630 and the electric path switching means 640, based on the notified resource information. The electric path transmission/reception means 630 generates a plurality of client signals that configure a requested traffic. The electric path switching means 640 controls a configuration of a plurality of client signals accommodated in an optical path and transfers the plurality of client signals to the variable optical path transmission/reception means 830 via the client signal line 901.

In the optical node device 801, the optical node device control means 820 controls the variable optical path transmission/reception means 830 and the optical path switching means 840, based on the notified resource information. The variable optical path transmission/reception means 830 generates an optical path that accommodates the plurality of client signals described above. The optical path switching means 840 allocates an optical path to the optical fiber transmission line 401. Through the operation described above, communication is established on the optical network 503.

Figures 13A, 13B:
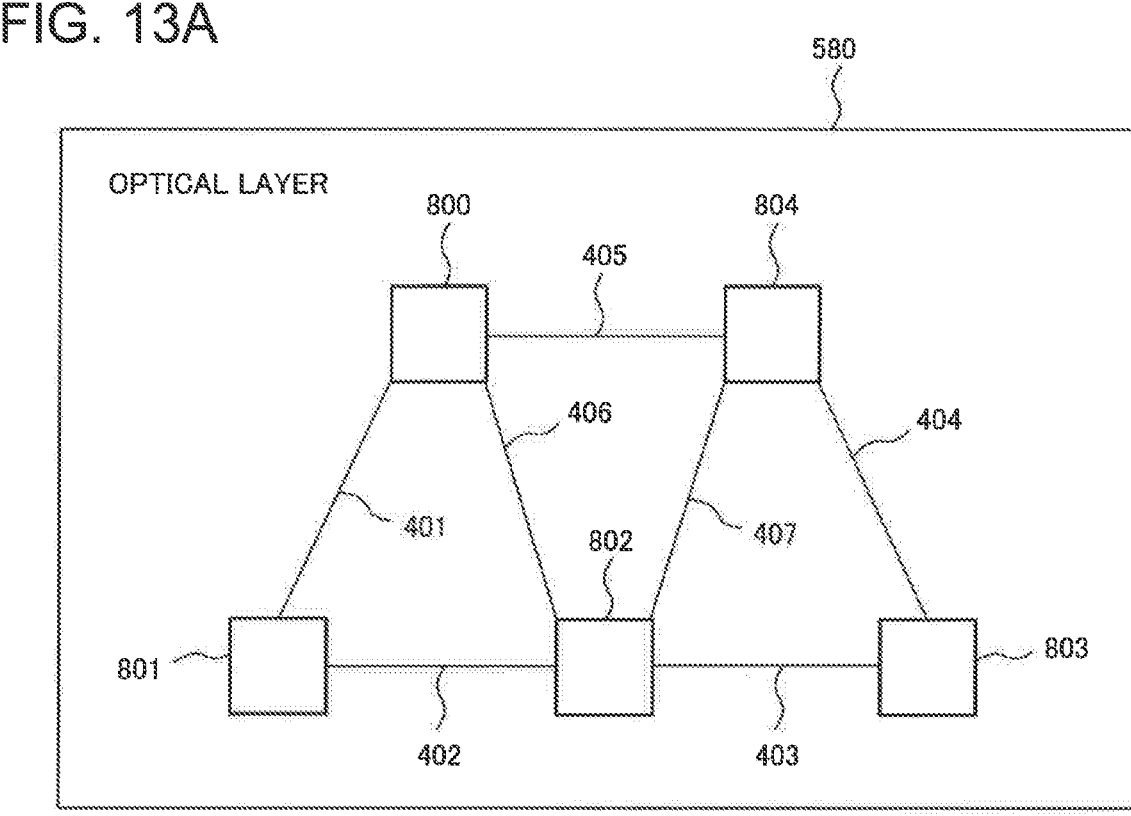
FIG. 13A is a block diagram illustrating a configuration of an optical fiber transmission line for illustrating an operation of the integration network control device according to the fourth example embodiment of the present invention.
FIG. 13B is a diagram illustrating a physical route metric value of an optical fiber transmission line for illustrating an operation of the integration network control device according to the fourth example embodiment of the present invention.

Next, allocation of an electric path among the electric node devices 600 to 603 for a requested traffic is described by using a specific example. Here, in order to accommodate a requested traffic on the optical network 503, it is assumed that two electric paths in total are needed between the electric node device 600 and the electric node device 603. FIG. 13A illustrates a configuration of the optical fiber transmission lines 401 to 407 included in the optical layer 580 in the optical network 503 used in the following description. FIG. 13B illustrates physical route metric values of the optical fiber transmission lines 401 to 407. These physical route metric values are managed in the optical layer information management database 113.

Figures 13C, 13D:
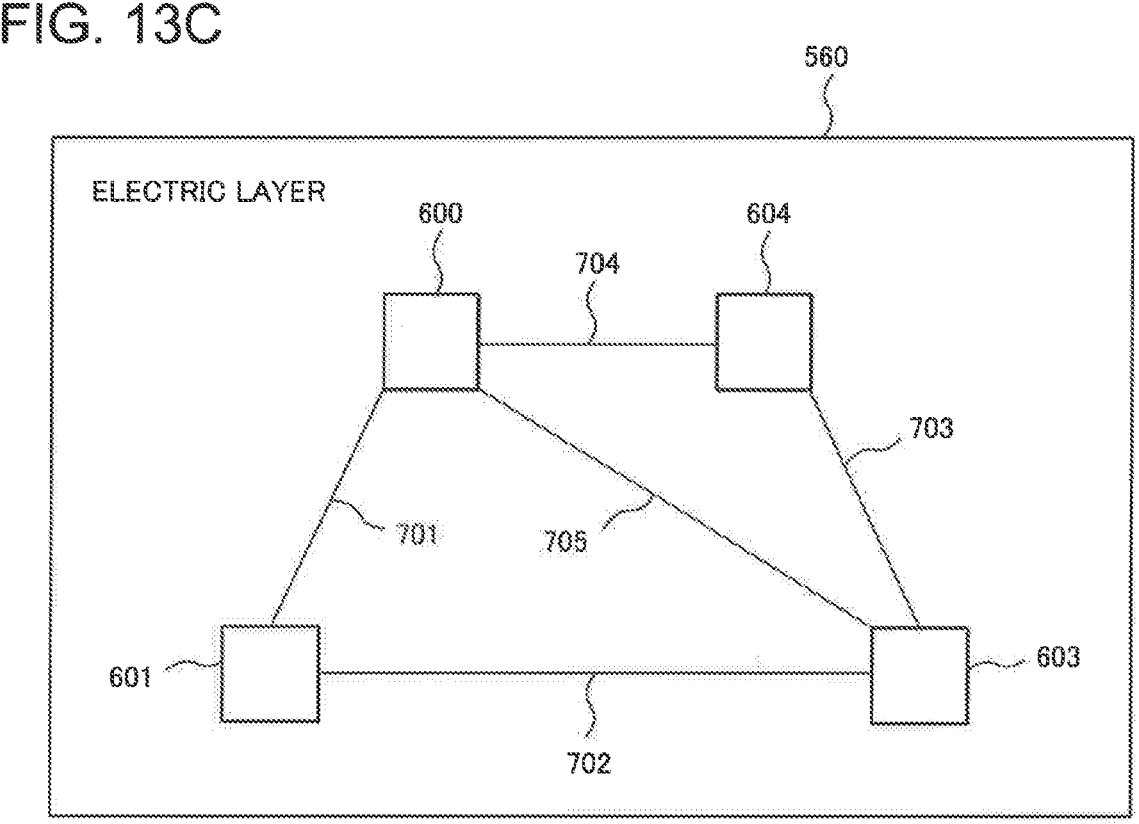
FIG. 13C is a block diagram illustrating a configuration of an electric node device and a logical link for illustrating an operation of the integration network control device according to the fourth example embodiment of the present invention.
FIG. 13D is a diagram illustrating a logical route metric value of a logical link for illustrating an operation of the integration network control device according to the fourth example embodiment of the present invention.
Figures 13E, 13F:
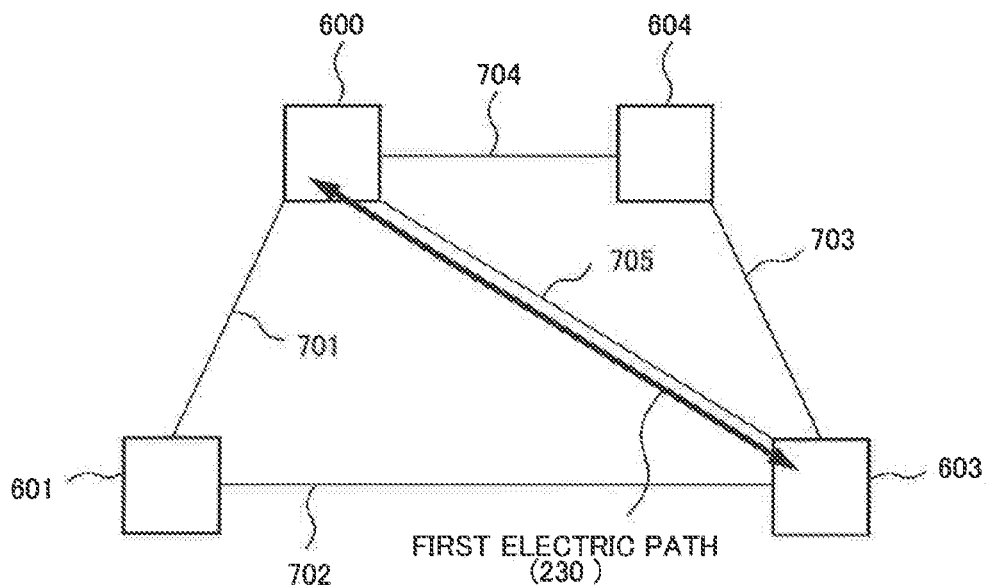
FIG. 13E is a block diagram illustrating a configuration of an electric node device and a logical link for illustrating an operation of the integration network control device according to the fourth example embodiment of the present invention and illustrates a state after allocating a first electric path.
FIG. 13F is a diagram illustrating a logical route metric value of a logical link for illustrating an operation of the integration network control device according to the fourth example embodiment of the present invention and illustrates a value after allocating a first electric path.

FIG. 13C illustrates a configuration of electric node devices 600, 601, 603, and 604 and logical links 701 to 705 included in the electric layer 560 in the optical network 503. FIG. 13D illustrates logical route metric values of the logical links 701 to 705, respectively. As illustrated in the figure, physical routes including the optical fiber transmission lines 401 to 407 correspond to the logical links 701 to 705, respectively. It is assumed herein that a logical route metric value is a physical route metric value of a physical route that configures the logical links 701 to 705, based on the correspondence relationship described above. From the logical route metric values illustrated in FIG. 13D, a first electric path is allocated to a route (the logical link 705) having a minimum logical route metric value from among routes linking the electric node device 600 and the electric node device 603 in the electric layer 560. Such state is illustrated in FIG. 13E. A route metric value of the allocated first electric path is 230 (110+120). The first electric path has been allocated, and thereby a logical route metric value of a logical link including the optical fiber transmission line 403 and the optical fiber transmission line 406 corresponding to the logical link 705 is updated to a value added with the logical route metric value (230) of the first electric path. The updated logical route value is illustrated in FIG. 13F.

Figure 13G:
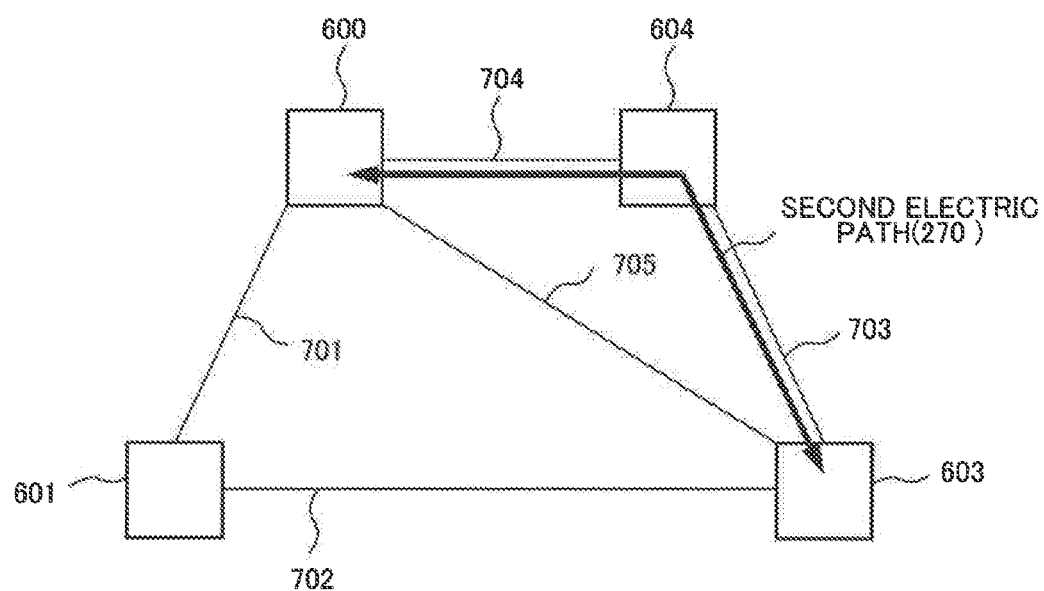
FIG. 13G is a block diagram illustrating a configuration of an electric node device and a logical link for illustrating an operation of the integration network control device according to the fourth example embodiment of the present invention and illustrates a state after allocating a second electric path.

A second electric path is allocated to a route (the logical paths 703 and 704) having a minimum logical route metric value (FIG. 13F) updated after accommodation of the first electric path. Such state is illustrated in FIG. 13G. In this manner, route search is executed for a requested traffic, and the two electric paths described above are determined. An optical path corresponding to these electric paths is allocated to the optical layer 580, based on communication quality of the optical fiber transmission lines 401 to 407 and reachability of an optical path. Thereby, communication in the optical network 503 is established.

As described above, according to the integrated network control device 103 of the present example embodiment, a route having a minimum logical route metric value of an electric path is selected, and thereby a route having maximum route diversity for an optical path can be selected. Therefore, while an increase in a calculation time for allocating resources of an electric path and an optical path is reduced, rapid recovery from faults in a plurality of locations of an optical network can be achieved.

The whole or part of the example embodiments disclosed above can be described as, but not limited to, the following supplementary notes.

(Supplementary Note 1)

An optical network control device including: a path setting means that sets, based on topology information including a connection relationship among a plurality of nodes and a first route selection index value of routes each connecting the plurality of nodes, a first path for a route having the first route selection index value being minimum from among route candidates linking a start point node and an end point node of a requested traffic; a topology information modification means that calculates a second route selection index value acquired by increasing the first route selection index value of the route that accommodates the first path; and a path selection means that selects a second path for a route having the second route selection index value being minimum from among the route candidates.

(Supplementary Note 2)

The optical network control device according to supplementary note 1, wherein: the route is a physical route associated with an optical transmission line connecting the plurality of nodes; the first path is a first optical path on the physical route and the second path is a second optical path on the physical route; the optical network control device further includes a topology information management database that manages the topology information; the path setting means includes an optical path route search means that searches for a route having the first route selection index value being minimum from among the route candidates; the topology information modification means includes a route metric calculation means that calculates the second route selection index value and a route metric update means that stores the second route selection index value on the topology information management database; and the path selection means includes an optical path route determination means that determines a route having the second route selection index value being minimum as a route for the second path.

(Supplementary Note 3)

The optical network control device according to supplementary note 2, wherein the route metric calculation means calculates the second route selection index value by executing any one of linear summing of a transmission line quality value being communication quality specific to the transmission line and an optical path specific value being a numerical value previously set for each of the first optical path, multiplication of the transmission line quality value and the optical path specific value, and replacement of the transmission line quality value with the optical path specific value.

(Supplementary Note 4)

The optical network control device according to supplementary note 3, wherein the route metric calculation means sets any one of the first route selection index value of the first optical path and the transmission line quality value of the first optical path as the optical path specific value.

(Supplementary Note 5)

The optical network control device according to any one of supplementary notes 2 to 4, further including an accommodation optical path identification means that identifies, when searching for a route for the second optical path, whether an already-set optical path to be accommodated in a route candidate to be searched is an optical path that accommodates the requested traffic or not, wherein the topology information modification means calculates, when the already-set optical path is an optical path that accommodates the requested traffic, a third route selection index value for a transmission line that accommodates the already-set optical path, and the path selection means selects a third optical path for a route having the third route selection index value being minimum from among the route candidates.

(Supplementary Note 6)

The optical network control device according to any one of supplementary notes 2 to 5, wherein the route metric calculation means calculates the second route selection index value according to a type of the first optical path, the type of the first optical path including at least one of quality of service of the requested traffic, a bandwidth guarantee rate, and an optical path protection type.

(Supplementary Note 7)

The optical network control device according to any one of supplementary notes 2 to 6, further including: a resource allocation determination means that determines allocation of a wavelength slot that accommodates the first optical path and the second optical path; and a setting notification means that notifies an optical node device of resource allocation information including information of a route of the first optical path and the second optical path and information of allocation of the wavelength slot.

(Supplementary Note 8)

An optical node device including: a setting reception means that accepts the resource allocation information from the setting notification means included in the optical network control device according to supplementary note 7; a variable optical path transmission/reception means that transmits signal light modulated based on a client signal that configures the requested traffic, to an optical fiber transmission line; an optical path switching means that switches an optical fiber transmission line to be connected, based on the resource allocation information; and an optical node device control means that controls the variable optical path transmission/reception means and the optical path switching means, based on the resource allocation information.

(Supplementary Note 9)

The optical network control device according to supplementary note 1, wherein: the route is a logical route associated with an electric layer connecting the plurality of nodes by an electric node device; the first path is a first electric path on the logical route and the second path is a second electric path on the logical route; the topology information management database includes an electric layer information management database that manages a configuration of a logical link associated with a physical route including an optical transmission line connecting the plurality of nodes, and a logical route selection index value of the logical link as the first route selection index value; the path setting means includes an electric path route search means that searches for a first logical route having the logical route selection index value being minimum from among route candidates of the first electric path that accommodates the requested traffic in the logical link; the path selection means includes an electric path route determination means that determines, as a route of the second electric path, a second logical route having a minimum modified logical route setting index value as the second route selection index value acquired by increasing the logical route selection index value of the first logical route; and the topology information modification means includes a route metric calculation means that refers to a configuration of a transmission line associated with a logical link that accommodates the first electric path and calculates the modified logical route setting index value.

(Supplementary Note 10)

An optical path setting method including: setting, based on topology information including a connection relationship among a plurality of nodes and a first route selection index value of routes each connecting the plurality of nodes, a first path for a route having the first route selection index value being minimum from among route candidates linking a start point node and an end point node of a requested traffic; calculating a second route selection index value acquired by increasing the first route selection index value of the route that accommodates the first path; and selecting a second path for a route having the second route selection index value being minimum from among the route candidates.

(Supplementary Note 11)

The optical network control device according to supplementary note 9, wherein the route metric calculation means calculates the modified logical route setting index value by executing any one of linear summing of a logical link quality value being logical link quality of the logical route and an electric path specific value being a numerical value previously set for each of the first electric path, multiplication of the logical link quality value and the electric path specific value, and replacement of the logical link quality value with the electric path specific value.

(Supplementary Note 12)

The optical network control device according to supplementary note 9 or 11, wherein the route metric calculation means sets, as the logical route selection index value, any one of a physical route metric value for a physical route that configures the logical route, an accommodation traffic capacity of the logical route, a usage rate of the logical route, a delay amount of the logical route, and a shared risk link group with respect to the logical route.

(Supplementary Note 13)

The optical network control device according to any one of supplementary notes 9, 11, and 12, further including a setting notification means that notifies the electric node device of information of a configuration of a plurality of client signals to be accommodated in an optical path on the logical route.

(Supplementary Note 14)

The optical path setting method according to supplementary note 10, further including calculating the second route selection index value by executing any one of linear summing of a transmission line quality value being communication quality specific to the route and an optical path specific value being a numerical value previously set for each of the first optical path, multiplication of the transmission line quality value and the optical path specific value, and replacement of the transmission line quality value with the optical path specific value.

(Supplementary Note 15)

The optical path setting method according to supplementary note 10 or 14, further including setting, as the optical path specific value, any one of the first route selection index value of the first optical path and the transmission line quality value of the first optical path.

(Supplementary Note 16)

The optical path setting method according to any one of supplementary notes 10, 14, and 15, further including: identifying, when searching for a route for the second optical path, whether an already-set optical path to be accommodated in a route candidate to be searched is an optical path that accommodates the requested traffic or not; calculating, when the already-set optical path is an optical path that accommodates the requested traffic, a third route selection index value for a transmission line that accommodates the already-set optical path; and selecting a third optical path for a route having the third route selection index value being minimum from among the route candidates.

(Supplementary Note 17)

The optical path setting method according to any one of supplementary notes 10 and 14 to 16, further including calculating the second route selection index value according to a type of the first optical path, the type of the first optical path including at least one of quality of service of the requested traffic, a bandwidth guarantee rate, and an optical path protection type.

(Supplementary Note 18)

A program that causes a computer to function as: a path setting means that sets, based on topology information including a connection relationship among a plurality of nodes and a first route selection index value of transmission lines each connecting the plurality of nodes, a first optical path for a route having the first route selection index value being minimum from among route candidates linking a start point node and an end point node of a requested traffic; a topology information modification means that calculates a second route selection index value acquired by increasing the first route selection index value of the transmission line that accommodates the first optical path; and a path selection means that selects a second optical path for a route having the second route selection index value being minimum from among the route candidates.

While the present invention has been particularly described with reference to example embodiments thereof, the present invention is not limited to the example embodiments. Various modifications understandable by those skilled in the art may be made in the configuration and details of the present invention, within the scope of the present invention.

This application is based upon and claims the benefit of priority from Japanese Patent Application No. 2016-197691, filed on Oct. 6, 2016, the disclosure of which is incorporated herein in its entirety by reference.

REFERENCE SIGNS LIST 1000, 100, 101, 102 Optical network control device
1100 Path setting means
1200, 121 Topology information modification means
1300 Path selection means
103 Integrated network control device
110, 111 Topology information management database
120 Optical path setting means
122 Optical path selection means
112 Electric layer information management database
113 Optical layer information management database
140, 142 Optical path route search means
141 Electric path route search means
150, 152 Optical path route determination means
151 Electric path route determination means
160, 161 Resource allocation determination means
170, 171 Route metric calculation means
180, 181 Route metric update means
190, 191 Setting notification means
200 Accommodation optical path identification means
300 to 305, 800 to 804 Optical node device
310 Setting reception means
320, 820 Optical node device control means
330, 830 Variable optical path transmission/reception means
340, 840 Optical path switching means
401 Optical fiber transmission line
500, 501, 502, 503 Optical network
560 Electric layer
580 Optical layer
600 to 603 Electric node device
610 Electric layer setting reception means
620 Electric node device control means
630 Electric path transmission/reception means
640 Electric path switching means
701 Logical link
810 Optical layer setting reception means
900, 901, 903, 904 Client signal line
10, 11, 12, 13 Optical communication system

What is claimed is:

1. An optical network control device comprising a computer configured to:
set, based on topology information including a connection relationship among a plurality of nodes and a first route selection index value of routes each connecting the plurality of nodes, a first path for a route having the first route selection index value being minimum from among route candidates linking a start point node and an end point node of a requested traffic;
calculate a second route selection index value acquired by increasing the first route selection index value of the route that accommodates the first path; and
select a second path for a route having the second route selection index value being minimum from among the route candidates, wherein
the second route selection index value is calculated by executing any one of linear summing of a transmission line quality value being communication quality specific to the route and an optical path specific value being a numerical value previously set for each of the first path, multiplication of the transmission line quality value and the optical path specific value, and replacement of the transmission line quality value with the optical path specific value.

2. The optical network control device according to claim 1, wherein:
the route is a physical route associated with an optical transmission line connecting the plurality of nodes;
the first path is a first optical path on the physical route and the second path is a second optical path on the physical route;
the optical network control device further comprises a topology information management database that manages the topology information;
the computer is further configured to:
search for a route having the first route selection index value being minimum from among the route candidates;
calculate the second route selection index value;
store the second route selection index value on the topology information management database; and
determine a route having the second route selection index value being minimum as a route for the second path.

3. The optical network control device according claim 2, wherein the computer is further configured to:
determine allocation of a wavelength slot that accommodates the first optical path and the second optical path; and notify an optical node device of resource allocation information including information of a route of the first optical path and the second optical path, and information of allocation of the wavelength slot.

4. An optical node device configured to:
accept the resource allocation information from the computer included in the optical network control device according to claim 3;
transmit signal light modulated based on a client signal that configures the requested traffic, to an optical fiber transmission line;
switch an optical fiber transmission line to be connected, based on the resource allocation information; and
control the computer, based on the resource allocation information.

5. The optical network control device according to claim 2, wherein the computer is further configured to:
identify, when searching for a route for the second optical path, whether an already-set optical path to be accommodated in a route candidate to be searched is an optical path that accommodates the requested traffic or not,
calculate, when the already-set optical path is an optical path that accommodates the requested traffic, a third route selection index value for a transmission line that accommodates the already-set optical path, and
select a third optical path for a route having the third route selection index value being minimum from among the route candidates.

6. The optical network control device according to claim 2, wherein
the computer calculates the second route selection index value according to a type of the first optical path, and
the type of the first optical path includes at least one of quality of service of the requested traffic, a bandwidth guarantee rate, and an optical path protection type.

7. The optical network control device according to claim 2, wherein the computer is further configured to:
determine allocation of a wavelength slot that accommodates the first optical path and the second optical path; and
notify an optical node device of resource allocation information including information of a route of the first optical path and the second optical path, and information of allocation of the wavelength slot.

8. The optical network control device according to claim 1, wherein
the computer is further configured to set any one of the first route selection index value of the first path and the transmission line quality value of the first path as the optical path specific value.

9. The optical network control device according to claim 1, wherein the computer is further configured to:
identify, when searching for a route for the second path, whether an already-set optical path to be accommodated in a route candidate to be searched is an optical path that accommodates the requested traffic or not,
calculate, when the already-set optical path is an optical path that accommodates the requested traffic, a third route selection index value for a transmission line that accommodates the already-set optical path, and
select a third path for a route having the third route selection index value being minimum from among the route candidates.

10. The optical network control device according to claim 1, wherein the computer is further configured to:
calculate the second route selection index value according to a type of the first path, and
the type of the first path includes at least one of quality of service of the requested traffic, a bandwidth guarantee rate, and an optical path protection type.

11. An optical network control device comprising:
a topology information management database including an electric layer information management database that manages a configuration of a logical link associated with a physical route including an optical transmission line connecting a plurality of nodes and a logical route selection index value of the logical link as a first route selection index value; and
a computer configured to:
set, based on topology information including a connection relationship among the plurality of nodes and the first route selection index value of routes each connecting the plurality of nodes, a first path for a route having the first route selection index value being minimum from among route candidates linking a start point node and an end point node of a requested traffic;
calculate a second route selection index value acquired by increasing the first route selection index value of the route that accommodates the first path;
select a second path for a route having the second route selection index value being minimum from among the route candidates, wherein the route is a logical route associated with an electric layer connecting the plurality of nodes by an electric node device, and the first path is a first electric path on the logical route and the second path is a second electric path on the logical route,
search for a first logical route having the logical route selection index value being minimum from among route candidates of the first electric path that accommodates the requested traffic in the logical link,
determine, as a route of the second electric path, a second logical route having a minimum modified logical route setting index value as the second route selection index value acquired by increasing the logical route selection index value of the first logical route, and
refer to a configuration of a transmission line associated with a logical link that accommodates the first electric path and calculate the modified logical route setting index value.

12. The optical network control device according to claim 11, wherein
the computer calculates the modified logical route setting index value by executing any one of linear summing of a logical link quality value being logical link quality of the logical route and an electric path specific value being a numerical value previously set for each of the first electric path, multiplication of the logical link quality value and the electric path specific value, and replacement of the logical link quality value with the electric path specific value.

13. The optical network control device according to claim 11, wherein
the computer sets, as the logical route selection index value, any one of a physical route metric value for a physical route that configures the logical route, an accommodation traffic capacity of the logical route, a usage rate of the logical route, a delay amount of the logical route, and a shared risk link group with respect to the logical route.

14. The optical network control device according to claim 11, wherein the computer is further configured to:
notify the electric node device of information of a configuration of a plurality of client signals to be accommodated in an optical path on the logical route.

15. An optical path setting method comprising:
setting, based on topology information including a connection relationship among a plurality of nodes and a first route selection index value of routes each connecting the plurality of nodes, a first path for a route having the first route selection index value being minimum from among route candidates linking a start point node and an end point node of a requested traffic;
calculating a second route selection index value acquired by increasing the first route selection index value of the route that accommodates the first path;
selecting a second path for a route having the second route selection index value being minimum from among the route candidates; and
calculating the second route selection index value by executing any one of linear summing of a transmission line quality value being communication quality specific to the route and an optical path specific value being a numerical value previously set for each of the first path, multiplication of the transmission line quality value and the optical path specific value, and replacement of the transmission line quality value with the optical path specific value.

16. The optical path setting method according to claim 15, further comprising
setting, as the optical path specific value, any one of the first route selection index value of the first path and the transmission line quality value of the first path.

17. The optical path setting method according to claim 15, further comprising:
identifying, when searching for a route for the second path, whether an already-set optical path to be accommodated in a route candidate to be searched is an optical path that accommodates the requested traffic or not; calculating, when the already-set optical path is an optical path that accommodates the requested traffic, a third route selection index value for a transmission line that accommodates the already-set optical path; and selecting a third path for a route having the third route selection index value being minimum from among the route candidates.

18. The optical path setting method according to claim 15, further comprising
calculating the second route selection index value according to a type of the first path,
the type of the first path including at least one of quality of service of the requested traffic, a bandwidth guarantee rate, and an optical path protection type.

* * * * *